(12) United States Patent
Togino et al.

(10) Patent No.: US 7,463,431 B2
(45) Date of Patent: Dec. 9, 2008

(54) OPTICAL SYSTEM

(75) Inventors: Takayoshi Togino, Shibuya-ku (JP); Shin Nakamura, Toshima-ku (JP)

(73) Assignee: Olympus Corporation, Tokyo (JP)

( * ) Notice: Subject to any disclaimer, the term of this patent is extended or adjusted under 35 U.S.C. 154(b) by 47 days.

(21) Appl. No.: 11/811,438

(22) Filed: Jun. 7, 2007

(65) Prior Publication Data

US 2008/0013191 A1    Jan. 17, 2008

(30) Foreign Application Priority Data

Jun. 9, 2006    (JP)    ............................. 2006-160623

(51) Int. Cl.
    *G02B 13/06*    (2006.01)
(52) U.S. Cl. ........................................ 359/725; 348/36
(58) Field of Classification Search ................. 359/366, 359/725, 729, 859, 731, 504; 348/36, 37, 348/335, 373; 434/44; 352/69
    See application file for complete search history.

(56) References Cited

U.S. PATENT DOCUMENTS

| | | | |
|---|---|---|---|
| 3,220,462 | A | 11/1965 | Hultgren et al. |
| 3,283,653 | A | 11/1966 | Tokarzewski |
| 3,552,820 | A | 1/1971 | Brachvogel |
| 4,566,763 | A | 1/1986 | Greguss |
| 5,473,474 | A | 12/1995 | Powell |
| 6,611,282 | B1 * | 8/2003 | Trubko et al. .................. 348/36 |

FOREIGN PATENT DOCUMENTS

| | | |
|---|---|---|
| JP | 3220462 | 8/2001 |
| JP | 2003-167195 | 6/2003 |

OTHER PUBLICATIONS

European Patent Office, European Search Report from application No. EP 07011381.6, dated Oct. 8, 2007.

* cited by examiner

*Primary Examiner*—Joseph Martinez
(74) *Attorney, Agent, or Firm*—Kenyon & Kenyon LLP

(57) ABSTRACT

The invention concerns an optical system which is adapted to take full-360° angle-of-view images from the surrounding scene or project images on the full-360° angles of view, and which has compact size, reduced flare light and high resolving power. The optical system comprises a front unit 10 having two reflective surfaces 11, 12 rotationally symmetric about a center axis 1, and a rear unit 20 that is rotationally symmetric about the center axis and has positive power. The front unit comprises a first reflective surface 11 located facing away from an entrance pupil 6Y and a second reflective surface 12 located facing away from the first reflective surface 11. The entrance pupil 6Y in a section including the center axis is disposed between the outer periphery of the first reflective surface 11 and the outer periphery of the second reflective surface 12. A light beam 2 incident from afar travels through the front unit 10 and the rear unit 20 in order, and is imaged at a position of an image plane 30 off the center axis. In the section including the center axis, the entrance pupil 6Y is positioned off the center axis, and in a section that is orthogonal to a plane including the center axis and includes a center ray of that light beam, a entrance pupil 6X is positioned on the center axis. The rear unit 20 comprises at least two groups.

14 Claims, 16 Drawing Sheets

US 7,463,431 B2

OPTICAL SYSTEM

This application claims benefit Japanese Application No. 2006-160623 filed in Japan on Jun. 9, 2006, the contents of which are incorporated by this reference.

BACKGROUND OF THE INVENTION

The present invention relates generally to an optical system, and more particularly to an optical system for panoramic cameras, panoramic projectors or the like, which is compact in size with high resolving power, and adapted to form full-360° angle-of-view images from the surrounding scene on an image plane or project images located on the image plane onto the full-360° angles of view.

For prior art optical systems adapted to obtain full-360° angle-of-view images from the surrounding scene using a catoptric system, there are such catoptric systems as set forth in Patent Publications 1, 2 and 3 known in the art, which are each built up of a front unit comprising a transparent medium that is rotationally symmetric about a center axis and has two internal reflective surfaces and two transmissive surfaces, and a rear unit that is rotationally symmetric about the center axis and has a positive power.

Patent Publication 1
U.S. Pat. No. 4,566,763
Patent Publication 2
U.S. Pat. No. 5,473,474
Patent Publication 3
U.S. Pat. No. 6,611,282

However, a problem common to the aforesaid prior art optical systems is that when the surrounding scene is taken with the optical system lying toward the zenith, images go worse because an entrance pupil in a section including the center axis is located at or near the center axis; the effective diameter of the entrance surface of the optical system grows large, giving rise to the incidence on the optical system of a lot more harmful flare light from the zenithal direction.

SUMMARY OF THE INVENTION

In view of such a problem with the prior art as mentioned above, an object of the present invention is to provide an optical system that is compact in size and substantially free from flare light and has a good resolving power for the purpose of taking a full-360° angle-of-view (panoramic) image or projecting an image located on an image plane onto a full-360° angle of view.

According to the invention, the aforesaid object is achievable by the provision of an optical system adapted to form a full-360° angle-of-view image on an image plane or project an image located in the image plane onto a full-360° angle of view, characterized by comprising:

a front unit including at least two reflective surfaces rotationally symmetric about a center axis and a rear unit that is rotationally symmetric about the center axis and has a positive power, wherein:

said front unit comprises, in order of travel of a light ray when said optical system is an imaging system or in an opposite order when said optical system is a projection system, a first reflective surface that is located facing away from an entrance pupil in a section including the center axis, on which entrance pupil a light beam from afar is incident, with the center axis located between them, and a second reflective surface that is located facing away from said first reflective surface with the center axis located between them, wherein a center of said first reflective surface is positioned on a rear unit side with respect to a center of said second reflective surface in a center axis direction, and the entrance pupil in the section including the center axis is located between an outer periphery of said first reflective surface and an outer periphery of said second reflective surface, and the light beam incident from afar travels through said front unit and said rear unit in order and is imaged at a position of said image plane off the center axis; in the section including the center axis, the entrance pupil is positioned off the center axis and positioned on the center axis in a plane that is orthogonal to a plane including the center axis and includes a center light ray of said light beam; and said rear unit is constructed of an optical system that comprises at least two groups and has a positive power.

Preferably in the invention, said rear unit comprises a rotationally symmetric, coaxial dioptric system.

In one preferable embodiment of the invention, said first reflective surface has positive power in both a meridional section and a sagittal section.

In another preferable embodiment of the invention, said second reflective surface has positive power in both a meridional section and a sagittal section.

In yet another embodiment of the invention, there is an aperture located somewhere on an image plane side with respect to said front unit, wherein said aperture is coaxial with the center axis.

In a further preferable embodiment of the invention, at least one reflective surface has a rotationally symmetric shape formed by rotation about the center axis of a line segment of any desired shape having no plane of symmetry.

In that case, it is preferable that said at leas one reflective surface has a rotationally symmetric shape formed by rotation about the center axis of a line segment of any desired shape including an odd-numbered order term.

In a further preferable embodiment of the invention, the optical system of the invention further comprises, in order of travel of a light ray when it is an imaging system or in an opposite order when it is a projection system, a relay optical system adapted to relay an image formed on said image plane to a second image plane.

Preferably in that case, it is preferable for the relay optical system to satisfy the following condition (1).

$$5 < F_b/h_0 \quad (1)$$

Here $F_b$ is the back focus of said relay optical system, and $h_o$ is the maximum height allowed for an image formed by said relay optical system.

It is also preferable for the optical system of the invention to satisfy the following condition (2).

$$10° < |\tan^{-1}(h/f_r)| \quad (2)$$

Here $f_r$ is the focal length of said rear unit, and h is the maximum height allowed for an annular image formed by said front unit.

With the invention as recited above, it is possible to achieve an optical system adapted to obtain a full-360° angle-of-view (panoramic) image or project an image onto a full-360° angle of view, which is less susceptible of influences of flare light and compact in size with well corrected aberrations and good resolving power.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The optical system of the invention is now explained with reference to some embodiments and examples.

Figure 1:
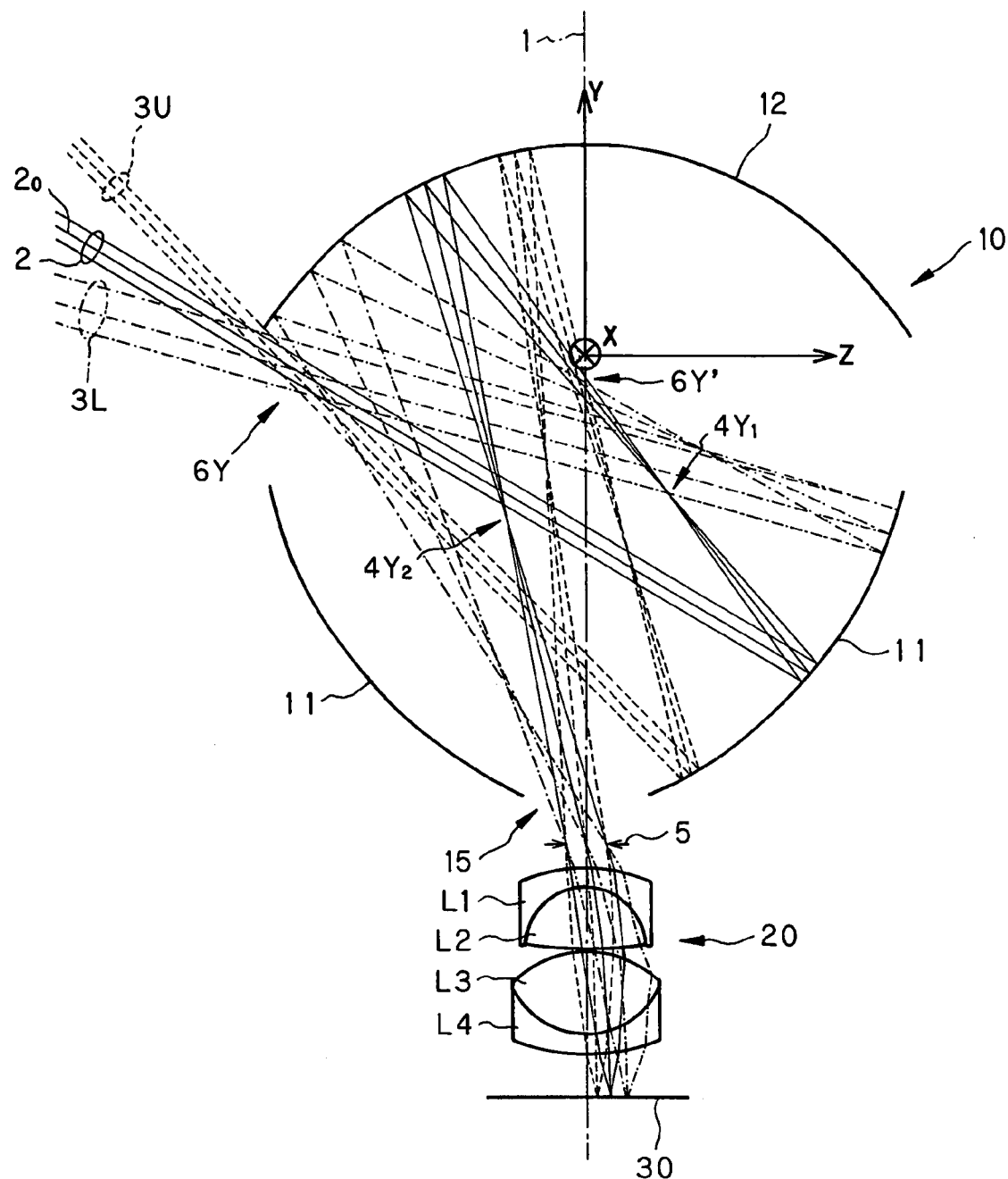
FIG. 1 is a sectional view of the optical system according to Example 1 of the invention as taken on the center axis.
Figure 2:
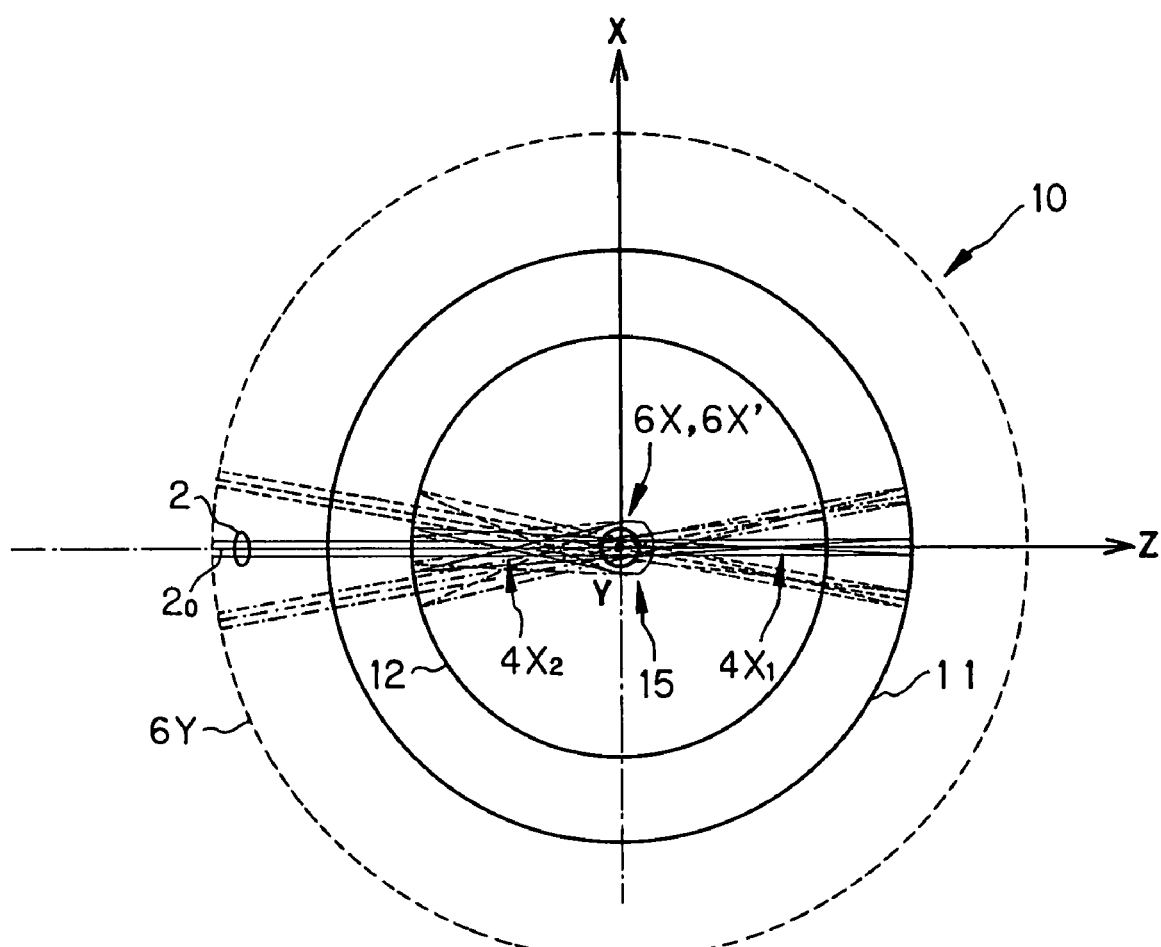
FIG. 2 is a plan view of an optical path through the optical system according to Example 1 of the invention.

FIG. 1 is a sectional view of the optical system according to Example 1 described later, as taken along the center axis (axis of rotational symmetry) 1, and FIG. 2 is a plan view of an optical path through that optical system. The optical system of the invention is first explained with reference to FIGS. 1 and 2. While, in the following description, the optical system of the invention will be described as an imaging optical system, it is understood that if the optical path is reversed, the optical system of the invention could be used as a projection optical system for projecting an image onto the surrounding full-360° angle-of-view screen. Note here that FIG. 2 shows an optical path taken by light incident from a direction with an azimuth angle of 0° plus an optical path taken by light incident from directions with azimuth angles of ±10°.

The optical system of the invention comprises a front unit 10 rotationally symmetric about the center axis 1 and a rear unit 20 rotationally symmetric about the center axis 1. Passing through the front unit 10 and the rear unit 20 in order, an incoming light beam 2 from an object in the distance is imaged at a position off the center axis 1 of an image plane 30 vertical to the center axis 1.

The front unit 10 is made up of a first reflective surface 11 and a second reflective surface 12 rotationally symmetric about the center axis 1, and the rear unit 20 is made up of a coaxial dioptric system such as a lens system that is rotationally symmetric about the center axis 1 and has positive power.

In the front unit 10, the center of the first reflective surface 11 (the point intersecting the center axis 1) is on the side of the rear unit 20 with respect to the center of the second reflective surface 12, and an entrance pupil 6Y in a section (meridional section) including the center axis 1 is positioned between the outer periphery of the first reflective surface 11 and the outer periphery of the second reflective surface 12.

And then, the incoming light beam 2 from afar passes through the entrance pupil 6Y in the meridional section, and enters between the first reflective surface 11 and the second reflective surface 12, whereupon it is reflected off at the first reflective surface 11—located facing away from the object with the center axis 1 between them—in a direction away from an image plane 30. Then, the reflected light is reflected off at the second reflective surface 12—located on the object side with respect to the center axis 1—in a direction toward the image plane 30. Then, the reflected light passes through a hole 15 in the center of the first reflective surface 11, enters a circular aperture 5 that is located between the front unit 10 and the rear unit 20 and coaxially with the center axis 1, and passes through the rear unit 20 of positive power, whereupon it is imaged at a radially given position of the image plane 30 off the center axis 1.

Thus, the front unit 10 takes a role of receiving a light beam from full-360° angle-of-view images toward the axis of rotational symmetry (center axis) 1 and converting them into an annular aerial image. And the role of the rear unit 20 is to project that annular aerial image onto the plane of an imaging device located at the image plane 30 plus to make up for field curvature and astigmatism that remain undercorrected at the front unit 10.

The entrance pupil is formed by back projection by the front unit 10 of the circular aperture 5 that is located between the front unit 10 and the rear unit 20 to form a stop; the feature of the invention is that in the meridional section, that entrance pupil is located as an entrance pupil 6Y in the meridional direction between the outer periphery of the first reflective surface 11 and the outer periphery of the second reflective surface 12 and in the sagittal section, on the other hand, that entrance pupil is projected as an entrance pupil 6X on the center axis (axis of rotational symmetry) 1 in the sagittal direction.

With the prior art (Patent Publication 1), both the entrance pupil in the meridional section and the entrance pupil in the sagittal section are located on the center axis, so that a flare stop for cutting unwanted light could not be effectively positioned.

In the invention, to prevent unwanted flare light from entering the optical system through the aperture, the entrance pupil 6Y is located in the meridional section alone between the outer periphery of the first reflective surface 11 and the outer periphery of the second reflective surface 12 so that the edges of the first reflective surface 11 and the second reflective surface 12 can be used as a stop for cutting flare light. It is thus possible to cut off most of unwanted light entering the front unit 10, thereby cutting back on flares.

Figure 11A:
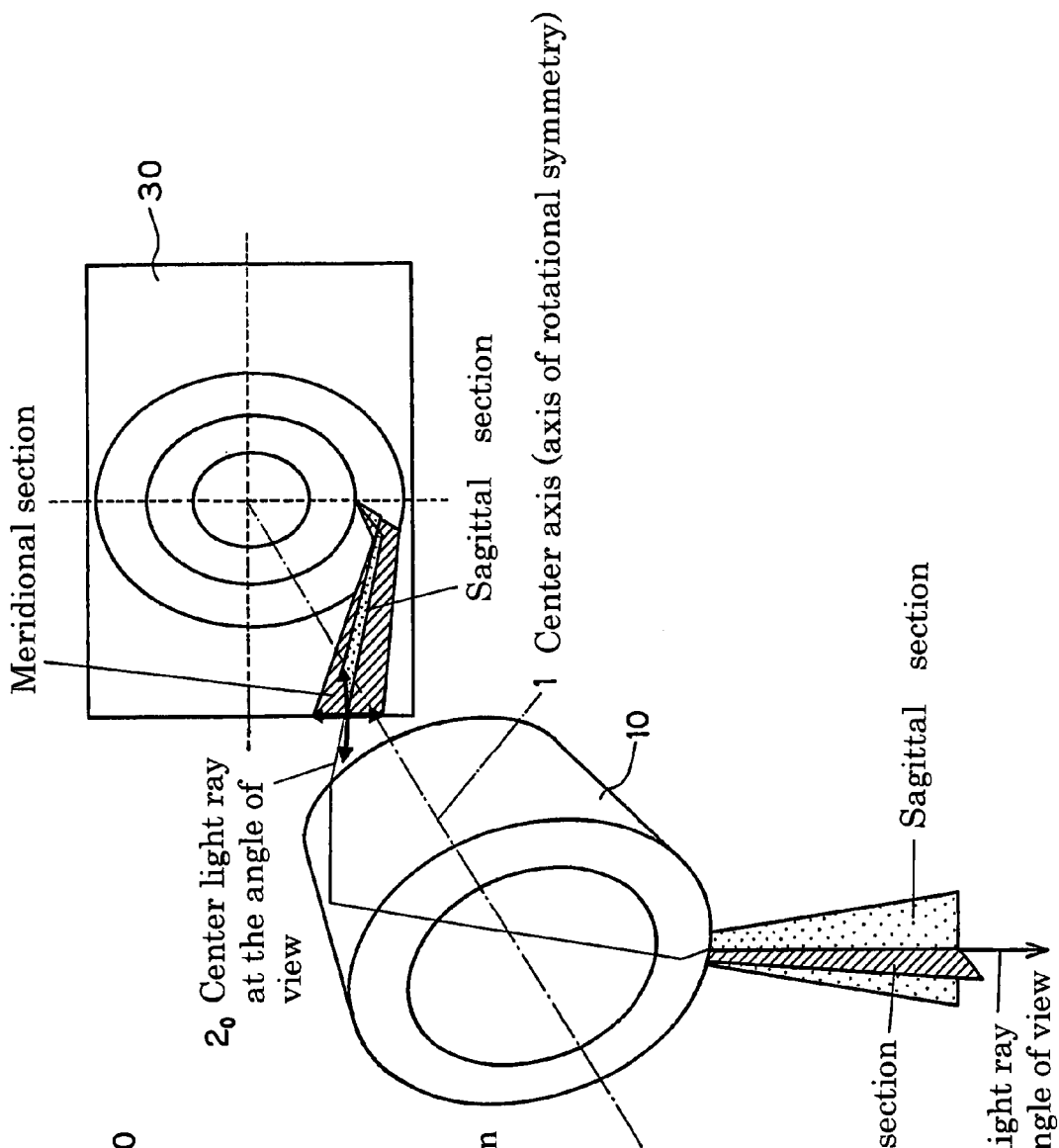
FIG. 11 is illustrative of the definition of the meridional, and the sagittal section.
Figure 11B:
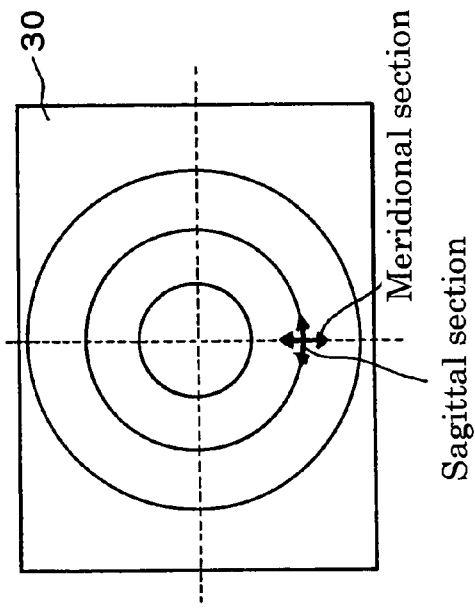

And now, the meridional section, and the sagittal section is defined as shown in FIG. 11. FIG. 11(*a*) is a perspective view roughly illustrative of the optical system of the invention, and FIG. 11(*b*) is illustrative of a section at the center position of the angle of view on the image plane 30. The meridional section here is defined as a section including the center axis (axis of rotational symmetry) 1 of the optical system and a center ray (chief ray) $2_0$ of a center beam arriving at the center of the angle of view, and the sagittal section here is defined as a section that is orthogonal to that meridional section and includes the center ray (chief ray) $2_0$.

If a slit-form mechanical stop is located at the position of the entrance pupil 6Y in the meridinal section, it may then be used as a flare stop. A casing for the purpose of protection of the optical system, or a transparent pipe-form member with an opaque portion painted black may also be used as a flare stop. Alternatively, the antireflection coating portion of the first reflective surface 11 may be used as the stop on the image plane 30 side (lower side), and a grained, black-painted portion may be used as a stop on the side (upper side) opposite to the image plane 30, because there is a large unavailable area between the first and the second reflective surface 12.

In the sagittal section, on the other hand, the front unit 10 takes the form of a rotationally symmetric system with the center axis (axis of rotational symmetry) 1 as its center axis; a light beam is going to transmit through it in a rotationally symmetric fashion and a light beam having the same image height as the annular image is going to pass on the center axis 1 constantly (FIG. 2). Accordingly, a light beam arriving on the circumference of the annular image in a direction orthogonal to the center axis 1 is going to pass once on the center axis 1, arriving at the image plane 30; the aperture 5 back projected in the sagittal section is going to lie on the center axis 1.

It is noted that to let the back projection position of the aperture 5 differ in the meridional section and the sagittal section as described above, it is required to let the focal length of the front unit 10 differ in the plane including the center axis 1 (the Y-Z direction) and in the plane orthogonal to the center axis 1 (the X-Z direction).

In the optical system of the invention, the curvature in the merdional section of a line segment of any desired shape that is rotated about the center axis 1 to determine the shape of the first reflective surface 11, and the second reflective surface 12, and the curvature of rotation of the line segment with respect to the center axis, viz., the curvature of the line segment in the sagittal section are given independently. This in turn allows the aperture 5 to be back projected and imaged once as an image 6Y', and then back projected and imaged as the entrance pupil 6Y in the meridional section, which lies between the outer periphery of the first reflective surface 11 and the outer periphery of the second reflective surface 12. It is thus possible to cut off most of unwanted light entering the front unit 10 and thereby cut back on flares.

In the sagittal section orthogonal to the center axis 1, on the other hand, the optical system takes the form of a rotationally symmetric system; a light beam is going to travel in a rotationally symmetric fashion, and a light beam having the same image height as the annular image is going to pass constantly twice on the center axis 1 that is the center of rotation (FIG. 2). In the sagittal section, therefore, the light beam arriving at the image plane 30 on the circumference has passed twice on the center axis 1; the entrance pupil 6X in the sagittal section— the image of the aperture 5 back projected in the sagittal section—is going to lie on the center axis 1 (an image 6X' is the first image of the aperture 5).

The arrangement being like such, it is important for the front unit 10 to be made up of a surface of rotationally symmetric shape defined by rotation about the center axis 1 of a line segment of any desired shape whose curvature can be freely controlled in the meridional section, and the sagittal section. Further, at the front unit 10 where light is reflected off at the decentered surfaces 11, 12 having power, there is a lot more decentration aberration produced. To correct this, it is important to use for the reflective surfaces 11, 12 in particular a surface shape that is obtained by rotation of a line segment of any desired shape having no plane of symmetry, with which an odd-number term or the like is used.

And, in the section including the center axis 1 (the meridional section: FIG. 1), light beams 2, 3U, 3L (3U is a light beam coming from the sky in the distance, and 3L is a light beam coming from the face of the earth in the distance) are imaged once at a position $4Y_1$ between the first reflective surface 11 and the second reflective surface 12 and again imaged at a position $4Y_2$ between the second reflective surface 12 and the aperture 5. And, in the plane that is orthogonal to the plane including the center axis 1 and includes a center ray $2_0$ of the light beam 2 (the sagittal section: FIG. 2), they are imaged once at a position $4X_1$ between the first reflective surface 11 and the second reflective surface 12 and again imaged at a position $4X_2$ between the second reflective surface 12 and the aperture 5.

While it is shown in Example 1 of FIG. 1 that there is an air or vacuum space between the first reflective surface 11 and the second reflective surface 12 in the front unit 10, it is contemplated that the space may be filled with a resin or other transparent medium having a refracting index of greater than 1. In that case, transmissive surfaces (entrance surface, exit surface) are formed at or near the entrance pupil 6Y position and the hole 15 in the meridional section, so that an optical system of smaller format with well corrected aberrations is achievable.

Further, to make sure the brightness of the image, it is preferable to construct the rear unit 20 in the form of a bright optical system. To this end, it is desirable that at least one group out of two lens groups be constructed of a cemented lens.

More preferably in both the meridional section and the sagittal section, the first reflective surface 11 has positive power at an area struck by the center chief ray $2_0$ at the angle of view in a vertical direction. This means that the first reflective surface 11 is concave on the center axis 1 side; it is a requirement for projection of the entrance pupil 6Y onto the opposite side with the center axis 1 between them. With otherwise shape, there would be no way of back projection of the entrance pupil.

Even more preferably, in both the meridional section and the sagittal section, the second reflective surface 12 has positive power at an area struck by the chief ray $2_0$. This is a requirement for the optical system adapted to project the entrance pupils 6Y, 6Y' twice, and to back project the aperture 5 located between the front unit 10 and the rear unit 20 and coaxially with the center axis 1 at the second reflective surface 12 and between the first reflective surface 11 and the second reflective surface 12, both the meridional section and the sagittal section must be of a concave shape having positive power. When one or both the sections have negative power, it is impossible to project the entrance pupil 6Y' between the first reflective surface 11 and the second reflective surface 12.

Even more preferably, it is important that the number of pupil image formation from the entrance pupils 6Y, 6X to the aperture 5 coaxial with the center be the same in the meridional section, and the sagittal section. In Examples 1 and 2 given later, the number of pupil image formation is two in both the meridional section and the sagittal section; both the reflective surfaces 11 and 12 that are located between them and have a chief optical power must have positive powers.

For the flare stop, a zonal slit rotationally symmetric about the center axis 1 may be disposed at or near the outer periphery of the second reflective surface 12.

Even more preferably, an image formed on the image plane 30 should be relayed (projected) to the second image plane via the relay optical system (Example 3), or the image projected by the relay optical system should be further projected by the optical system of the invention. Especially when there is a wide-angle arrangement having a vertical angle of view of at least 30°, the annular image converted at the front unit 10, too, is going to become a wide angle-of-view image with respect to the rear unit 20. This is required for the front unit 10 to make sure an effective area. To this end, the rear unit 20 must take the form of a front stop type wide angle optical system, but it is difficult to make sure a back focus.

When there is a high-resolution projection or image pickup involved, on the other hand, a 3-chip type arrangement adapted to divide light rays into the three primary colors RGB is generally used; there is the need of locating a color synthesis prism or a color separation prism. With the arrangement of the invention, however, there is none of the space for receiving such a prism optical system.

Therefore, it is preferable to use the relay optical system to relay the image once and, at the same time, make sure a space for receiving a color synthesis prism or a color separation prism. If the magnification of the relay optical system is chosen as desired, it is then possible to increase the degree of flexibility in the size of the front unit 10.

Even more preferably, the following condition (1) should be satisfied:

$$5 < F_b/h_0 \quad (1)$$

where $F_b$ is the back focus of the relay optical system, and $h_0$ is the maximum height allowed for an image formed by the relay optical system. As the lower limit of 5 to condition (1) is not reached, it makes it impossible to take a space for receiving a color synthesis prism or a color separation prism.

Even more preferably, the following condition (2) should be satisfied:

$$10° < |\tan^{-1}(h/f_r)| \quad (2)$$

where $f_r$ is the focal length of the rear unit 20, and h is the maximum height allowed for an annular image formed by front unit 10. This condition concerns the angle of view of the rear unit 20, meaning that as the projection angle of view grows wide, the angle of view of the annular image converted by the front unit 10, too, grows wide. For this reason, it is also required to make the angle of view of the rear unit 20 wide, but as the lower limit of 10° to condition (2) is not reached, it renders it impossible to make the taking angle of view wide.

And now, the optical system of the invention is characterized in that the entrance pupil 6Y in the section including the center axis 1 (the meridional section) is projected onto the vicinity of the second reflective surface 12 away from the center axis 1; that characteristic feature enables the flare stop for prevention of ghosts, etc. to be effectively located. This in turn makes it possible to diminish the entrance area of the optical system in the section including the center axis 1, and provide effective prevention of unwanted light incident on the front unit 10, taking effect on drastic prevention of flares.

To make sure a wide taking angle of view while downsizing the optical system, it is required to locate the circular aperture 5 that forms the stop near the front unit 10. To this end, it is important to satisfy the following condition.

More specifically, it is preferable to satisfy condition (3) given below:

$$0.1 < |A/B| < 5 \quad (3)$$

where, in the section including the center axis 1, A is the distance from the position of the entrance pupil 6Y to the center axis 1, B is the distance between the entrance pupil 6Y and the aperture 5 as measured along the center axis 1, and |A/B| is the A to B ratio. As the lower limit of 0.1 to this condition is not reached, it causes the entrance pupil 6Y to approach the center axis, and so flare light to be likely to enter the optical system. As the upper limit of 5 is exceeded, it causes the distance from the aperture 5 to the front unit 10 to grow too long to take a wide enough taking angle of view, because there is an obstacle to light rays leaving the front unit 10 at the first reflective surface 11 in particular.

More preferably, $$0.2 < |A/B| < 2 \quad (3\text{-}1)$$

Set out below are the values of conditions (1), (2) and (3) in Examples 1, 2 and 3 given later.

|  | Ex. 1 | Ex. 2 | Ex. 3 |
|---|---|---|---|
| $F_b/h_0$ | — | — | 8.58 |
| $|\tan^{-1}(h/f_r)|$ | 22.83 | 18.08 | — |
| A | 15.44 | 15.44 | — |
| B | 23.80 | 23.80 | — |
| |A/B| | 0.65 | 0.65 | — |

Examples 1, 2 and 3 of the optical system according to the invention are now explained in further details. Constituting parameters concerning these optical systems are figured out based on the results of normal ray tracing from the object plane to the image plane 30 via the front unit 10 and the rear unit 20, as shown typically in FIG. 1.

Referring to a coordinate system on normal ray tracing, the origin of a decentered optical surface in a decentered optical system is defined by the position of the entrance pupil 6Y projected onto the axis of rotational symmetry (center axis) 1, the Y-axis positive direction is defined by a direction of the axis of rotational symmetry (center axis) 1 facing away from the image plane 30, and the Y-Z plane is defined by the drawing sheet plane of FIG. 1. And then, the Z-axis positive direction is defined by a direction opposite to the side of the entrance pupil 6Y now considered in the drawing sheet plane of FIG. 1, and the X-axis positive direction is defined by an axis that forms with the Y- and Z-axes a right-handed orthogonal coordinate system.

Given for a decentered surface are the amount of decentration from the center of the origin of the aforesaid optical system on a coordinate system on which that surface is defined (X, Y and Z are indicative of the X-axis direction, the Y-axis direction, and the Z-axis direction, respectively), and the angles of tilt (α, β, γ (°)) of the coordinate systems for defining the surfaces with the centers on the X-, Y- and Z-axes, respectively. In that case, the positive signs for α and β mean counterclockwise rotation with respect to the positive directions of the respective axes, and the positive sign for γ means clockwise rotation with respect to the positive direction of the Z-axis. Referring here to how to perform α-, β- and γ-rotations of the center axis of the surface, the coordinate system that defines each surface is first α-rotated counterclockwise about the X-axis of the coordinate system that is defined at the origin of the optical system. Then, the coordinate system is β-rotated counterclockwise about the Y-axis of the rotated new coordinate system. Then, the coordinate system is γ-rotated clockwise about the Z-axis of the rotated new another coordinate system.

When, of optical surfaces forming the optical system of each example, a specific surface and the subsequent surface form together a coaxial optical system, there is a surface spacing given. Besides, the radius of curvature of each surface and the refractive index and Abbe number of the medium are given according to common practices.

It is also noted that the term with respect to aspheric surfaces on which no data are mentioned in the constituting parameters, given later, is zero. Refractive indices and Abbe numbers are given on a d-line (587.56 nm wavelength) basis, and length in mm. The decentration of each surface is given in terms of the amount of decentration from the position of the entrance pupil 6Y projected onto the axis of rotational symmetry (center axis) 1.

It is further noted that the aspheric surface is a rotationally symmetric surface given by the following defining equation.

$$Z=(Y^2/R)/[1+\{1-(1+k)Y^2/R^2\}^{1/2}]+aY^4+bY^6+cY^8+dY^{10}+\ldots \quad (a)$$

Here Z is an axis, and Y is a direction vertical to the axis, and R is a paraxial radius of curvature, k is a conical coefficient, and a, b, c, d, . . . are the $4^{th}$, $6^{th}$, $8^{th}$, and $10^{th}$-order aspheric coefficients, respectively.

The extended rotation free-form surface here is a rotationally symmetric surface given by the following definition.

First, there is the following curve (b) given, passing on a Y-Z coordinate plane through its origin.

$$Z=(Y^2/RY)/[1+\{1-(C_1+1)Y^2/RY^2\}^{1/2}]C_2Y+C_3Y^2+C_4Y^3+C_5Y^4+C_6Y^5+C_7Y^6+\ldots+C_{21}Y^{20}+\ldots+C_{n+1}Y^n+\ldots \quad (b)$$

Then, there is a curve F(Y) given, where the curve (b) is rotated by an angle θ (°) with anticlockwise rotation defined as positive relative to the X-axis positive direction. This curve F(Y), too, passes on the Y-Z coordinate plane through the origin.

That curve F(Y) is parallel translated by a distance R in the Z-positive direction (in the Z-negative direction in the case of a negative sign), and the parallel translated curve is then rotated about the Y-axis. The thus obtained rotationally symmetric surface gives an extended rotation free-from surface.

As a consequence, the extended rotation free-form surface provides a free-form surface (smooth curve) in the Y-Z plane, and a circle with a radius |R| in the X-Z plane.

From this definition, the Y-axis becomes the axis of the extended rotation free-form surface.

Here, RY is the radius of curvature of a spherical term in the Y-Z section, $C_1$ is a conical constant, and $C_2$, $C_3$, $C_4$, $C_5$, . . . are the first-, second-, third- and fourth-order aspheric coefficients, respectively.

And then, in the optical system of the invention, at least one reflective surface in the front unit 10 is such an extended rotation free-form surface. It is then preferable that when that surface is expressed in term of a polynomial in the Y-Z section, it has a rotationally symmetric shape formed by rotation about the center axis 1 of a line segment of any desired shape having at least an odd-numbered term but no plane of symmetry. By allowing at least one reflective surface to have such a surface shape, it is possible to achieve an optical system having an improved resolving power wherein decentration aberrations unavoidable with a catoptric system are corrected and, at the same time, downsize that optical system.

FIG. 1 is a sectional view of the optical system of Example 1 as taken along the center (axis of rotational symmetry) 1, and FIG. 2 is a plan view illustrative of an optical path through that optical system. Note here that FIG. 2 shows an optical path taken by light incident from an azimuth angle of 0° plus an optical path taken by light incident from a direction of ±10°.

The optical system according to this example is made up of the front unit 10 rotationally symmetric about the center axis 1, the rear unit 20 rotationally symmetric about the center axis 1, and the aperture 5 disposed coaxially with the center axis 1 between the front unit 10 and the rear unit 20. The light beam 2 incident from an object in the distance passes through the front unit 10 and the rear unit 20 in order, and is then imaged at a position off the center axis 1 of the image plane 30 vertical to the center axis 1. As the center axis 1 is set vertically, for instance, it permits a full-360° angle-of-view annular image to be imaged at the image plane 30, with the zenithal direction lying toward the center of the image and the horizontal defining an outer circle.

The front unit 10 is constructed of the first reflective surface 11 and the second reflective surface 12, each rotationally symmetric about the center axis 1, and the rear unit 20 consists of a lens system of positive power including four lenses L1, L2, L3 and L4 or two lens groups.

More specifically, the front unit 10 is made up of the first reflective surface 11 and the second reflective surface 12, wherein the first reflective surface 11 is located on a side facing away from the object side with the center axis 1 between them; the second reflective surface 12 is located on the object side with respect to the center axis 1; and the first reflective surface 11 is located nearer to the image plane 30 side than the second reflective surface 12.

And, the light beam 2 incident from afar enters between the first reflective surface 11 and the second reflective surface 12 via the entrance pupil 6Y in the meridional section between the outer periphery of the first reflective surface 11 and the outer periphery of the second reflective surface 12, and is reflected off at the first reflective surface 11 located facing away from the entrance pupil 6Y with the center axis 1 between them in a direction away from the image plane 30. Then, the reflected light is reflected off at the second reflective surface 12 toward the image plane 30 side, wherein the second reflective surface 12 is located on the same side as the entrance pupil 6Y with respect to the center axis 1. Then, the reflected light passes through the center hole 15 in the first reflective surface 11, and is imaged at a radially given position of the image plane 30 off the center axis 1 upon passing through the stop-forming circular aperture 5—located coaxially with the center axis 1 between the front unit 10 and the rear unit 20—and the rear unit 20 of positive power in order. Each of the first reflective surface 11 and the second reflective surface 12 in the front unit 10 is constructed of an extended rotation free-form surface, provided that the conical constant is zero.

The lens system that forms the rear unit 20 is made up of, in order from the front unit 10 side, a cemented lens of a negative meniscus lens L1 convex on the front unit 10 side and a double-convex positive lens L2, and a cemented lens of a double-convex positive lens L3 and a negative meniscus lens L4 concave on the front unit 10 side.

And, as the center axis 1 lies in the vertical direction and the image plane 30 lies in the zenithal direction, the center light beam 2 incident from afar in a direction of an angle of elevation of 10° is reflected off at the first reflective surface 11 and the second reflective surface 12 in the front unit 10 in order, leaving the front unit 10 through the center hole 15 in the first reflective surface 11. The reflected light enters the rear unit 20 through the aperture 5, and is then imaged a radially given position of the image plane 30 off the center axis 1.

In the optical system of this example, the aperture (stop) 5 positioned between the front unit 10 and the rear unit 20 is projected onto the object side and imaged once as the image 6Y' in the meridional section, which is again back projected as the entrance pupil 6Y in the meridional section such that it is formed between the outer periphery of the first reflective surface 11 and the outer periphery of the second reflective surface 12 in the front unit 10. In the sagittal section, the aperture 5 is imaged twice as the images 6X', 6X on the center axis (axis of rotational symmetry) 1.

And, in the section including the center axis 1 (the meridional section: FIG. 1), the light beams 2, 3U, 3L (3U is a light beam coming from the sky in the distance, and 3L is a light beam coming from the face of the earth in the distance) are imaged once at the position $4Y_1$ between the first reflective surface 11 and the second reflective surface 12 and again imaged at the position $4Y_2$ between the second reflective surface 12 and the aperture 5. And, in the plane that is orthogonal to the plane including the center axis 1 and includes the center ray $2_0$ of the light beam 2 (the sagittal section: FIG. 2), they are imaged once at the position $4X_1$ between the first reflective surface 11 and the second reflective surface 12 and again imaged at the position $4X_2$ between the second reflective surface 12 and the aperture 5.

The specifications of Example 1 are:

| | |
|---|---|
| Horizontal angle of view: | 360° |
| Vertical angle of view: | 30° (the center angle of view of 30° (elevation angle) |
| Entrance pupil diameter: | 1.05 mm |
| Image size: | φ1.00-φ3.96 mm |

With the image plane 30 lying parallel with the face of the earth, the optical system of Example 1 is preferably used at an angle of view lying up at the sky.

Figure 3:
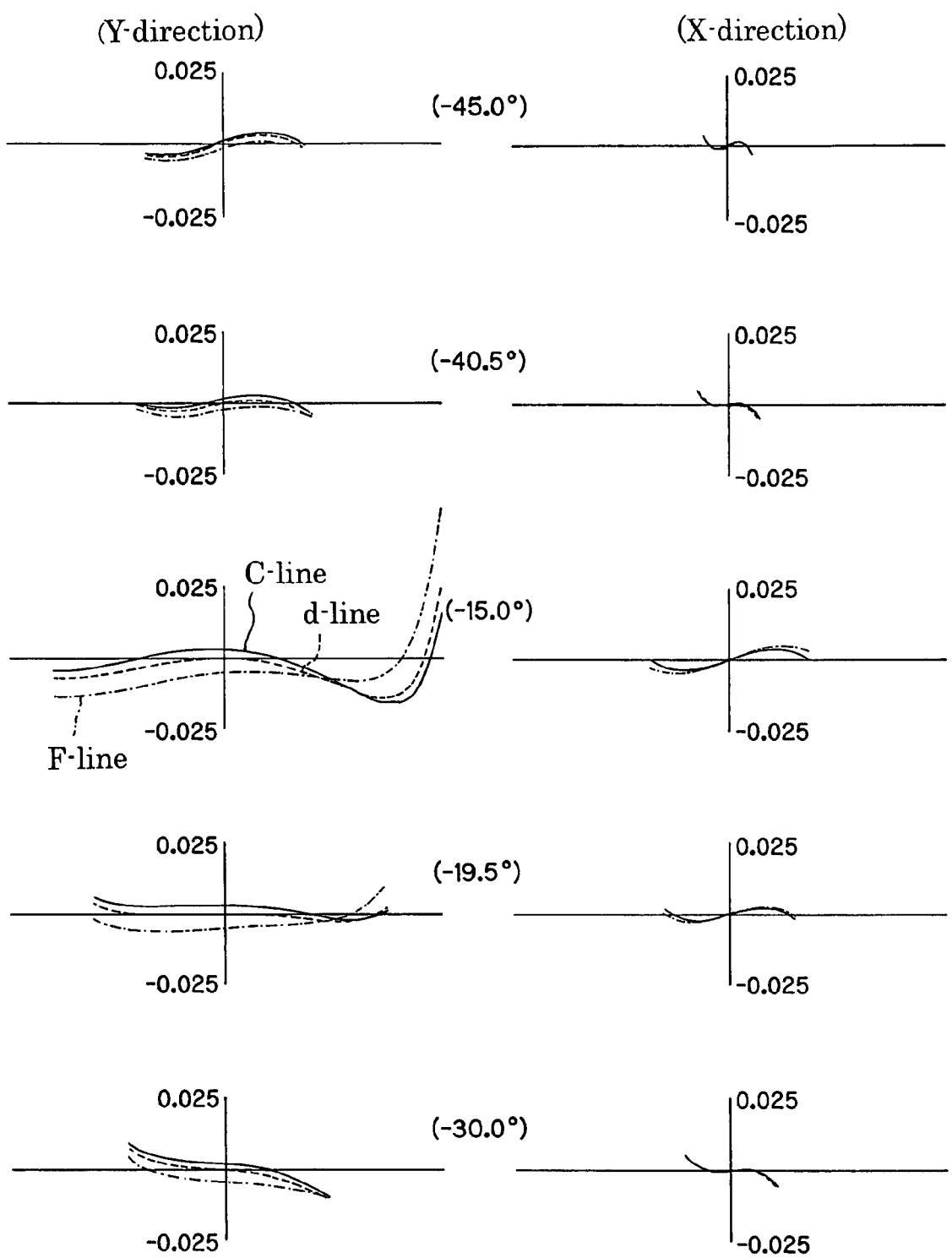
FIG. 3 is a transverse aberration diagram for the whole optical system according to Example 1.

FIG. 3 is a transverse aberration diagram for the whole optical system of Example 1. The angle at the middle stands for the angle of view in the vertical direction, indicating transverse aberrations at that angle of view in the Y direction (meridional direction) and in the X direction (sagittal direction). Throughout the disclosure, that the positive angle of view is indicative of a depression angle, and the negative of an elevation angle.

Figure 4:
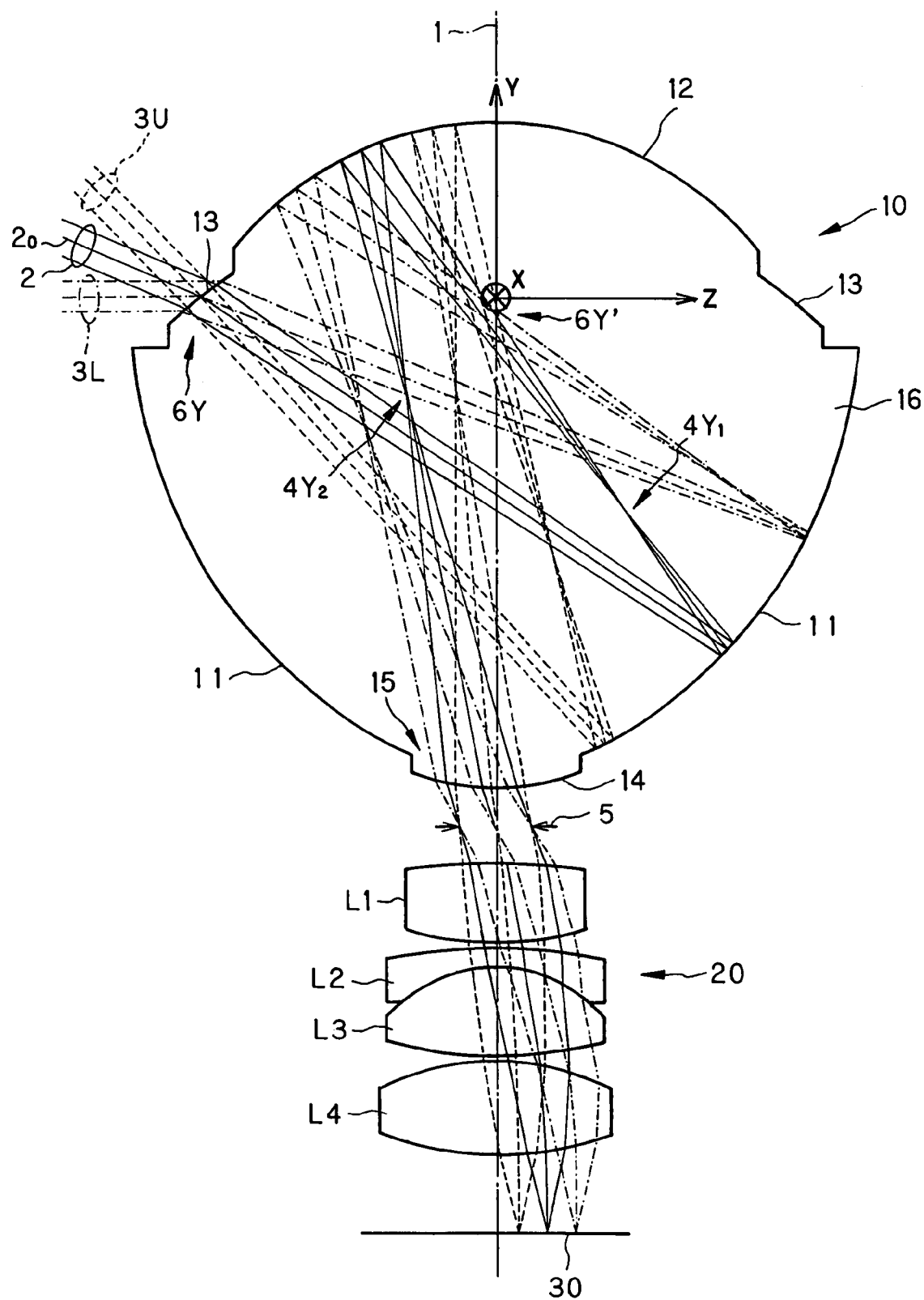
FIG. 4 is a sectional view of the optical system according to Example 2 of the invention, as taken on the center axis.
Figure 5:
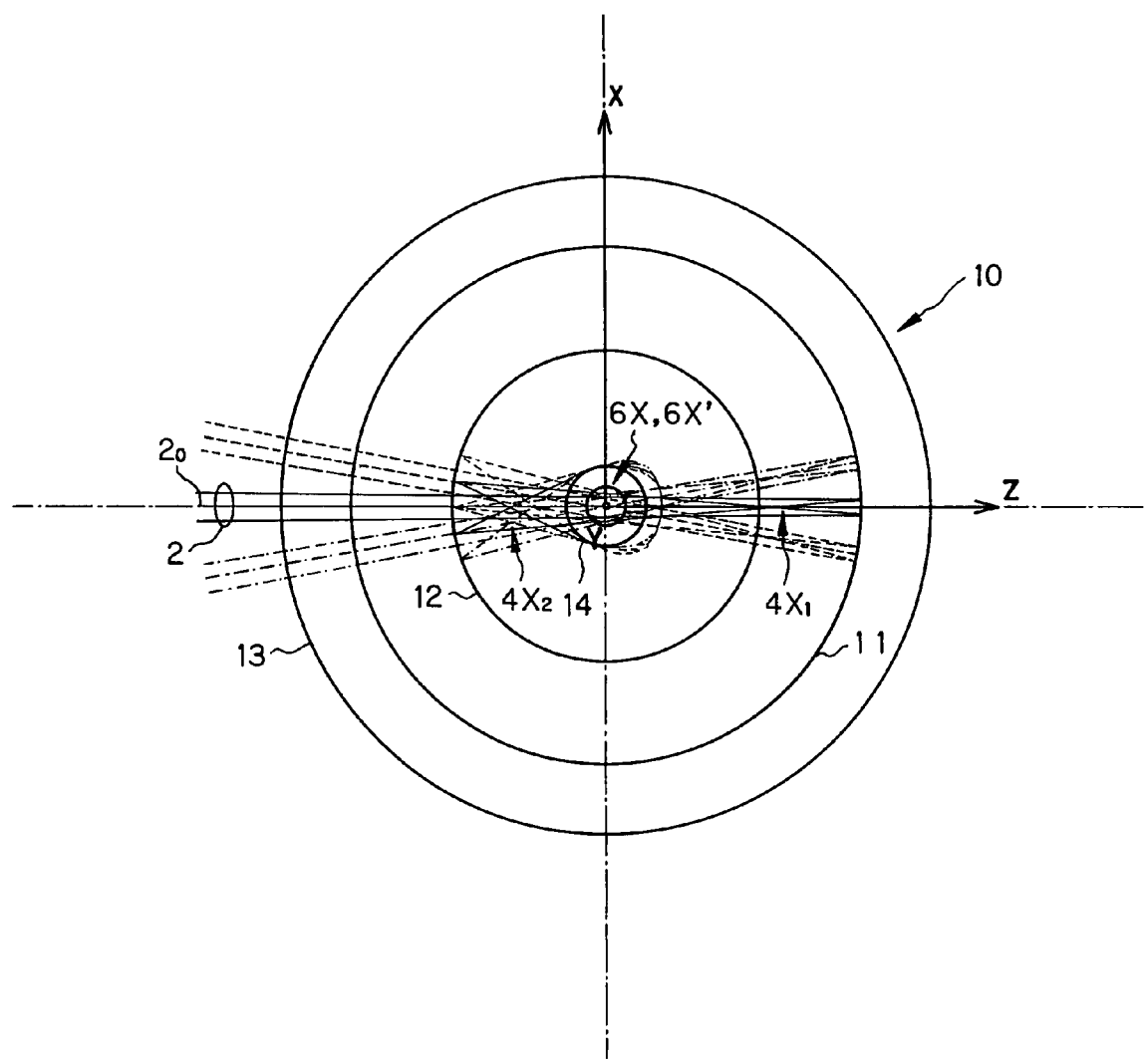
FIG. 5 is a plan view of an optical path through the optical system according to Example 2 of the invention.

FIG. 4 is a sectional view of the optical system of Example 2 as taken along the center (axis of rotational symmetry) 1, and FIG. 5 is a plan view illustrative of an optical path through that optical system. Note here that FIG. 5 shows an optical path taken by light incident from an azimuth angle of 0° plus an optical path taken by light incident from a direction of ±10°.

The optical system according to this example is one having a resin or other transparent medium 17 having a refractive index of greater than 1 and filled in a space between the first reflective surface 11 and the second reflective surface 12 in the front unit 10. More specifically, the optical system is made up of the front unit 10 rotationally symmetric about the center axis 1, the rear unit 20 rotationally symmetric about the center axis 1, and the aperture 5 disposed coaxially with the center axis 1 between the front unit 10 and the rear unit 20. The light beam 2 incident from an object in the distance passes through the front unit 10 and the rear unit 20 in order, and is then imaged at a position off the center axis 1 of the image plane 30 vertical to the center axis 1. As the center axis 1 is set vertically, for instance, it permits a full-360° angle-of-view annular image to be imaged at the image plane 30, with the zenithal direction lying toward the center of the image and the horizontal defining an outer circle.

The front unit 10 comprises the first reflective surface 11 and the second reflective surface 12, each rotationally symmetric about the center axis 1, plus the first transmissive surface 13 entering the transparent medium 16 and the second transmissive surface 14 leaving the transparent medium 15. The first transmissive surface 13, and the second transmissive surface 14, too, is configured in such a way as to be rotationally symmetric about the center axis 1. And then, the first transmissive surface 13 is located on the object side with the center axis 1; the first reflective surface 11 is located facing away from the first transmissive surface 13 with the center axis 1 between them and disposed nearer to the image plane 30 side than the first transmissive layer 13; the second reflective surface 12 is located on the same side as the first transmissive layer 13 with respect to the center axis 1; and the second transmissive surface 14 is located near the center hole 15 in the first reflective surface 11 and nearer to the image plane 30 side than the first transmissive surface 11.

On the other hand, the rear unit 20 consists of a lens system of positive power including four lenses L1, L2, L3 and L4 or three lens groups.

And, the light beam incident from afar enters the transparent medium 16 via the first transmissive surface 13, and is reflected off at the first reflective surface 11—located facing away from the first transmissive surface 13 with the center axis 1 between them—in a direction away from the image plane 30. Then, the reflected light is reflected off the second reflective surface 12—located on the same side as the first transmissive surface 13 with respect to the center axis 1—in a direction toward the image plane 30 side, leaving the transparent medium 16 via the second transmissive surface 14. Then, the reflected light is imaged at a radially given position of the image plane 30 off the center axis 1 upon traveling through the circular aperture 50—located between the front unit 10 and the rear unit 20 and coaxially with the center axis 1—and the rear unit 20 of positive power in order. Each of the first reflective surface 11, the second reflective surface 12 and the first transmissive surface 13 in the front is constructed of an extended rotation free-form surface, provided that the conical constant is zero. The second transmissive layer 14 is constructed of a rotationally asymmetric aspheric surface with the vertex lying on the center axis 1.

The lens system that forms the rear unit 20 is made up of, a double-convex positive lens L1 and a cemented lens of a negative meniscus lens L2 convex on the front unit 10 side and a double-convex positive lens L3, and a double-convex positive lens L4.

And, as the center axis 1 lies in the vertical direction and the image plane 30 lies in the zenithal direction, the center light beam 2 incident from afar in a direction of an angle of elevation of 2.5° is refracted at the entrance surface in the first unit 10, viz., the first transmissive surface 13, entering the transparent medium 16. The light beam is then reflected at the first reflective surface 11 and the second reflective surface 12 in order, leaving the transparent medium in the front unit 10 upon refraction at the second transmissive surface 14. Then, the light beam enters the rear unit 20 via the aperture 5, and is imaged at a radially given position of the image plane 30 off the center axis 1.

In the optical system of this example, the aperture (stop) 5 positioned between the front unit 10 and the rear unit 20 is projected onto the object side and imaged once as the image 6Y' in the meridional section, which is again back projected as the entrance pupil 6Y in the meridional section such that it is formed near the first transmissive surface 13 between the outer periphery of the first reflective surface 11 and the outer periphery of the second reflective surface 12 in the front unit 10. In the sagittal section, the aperture 5 is imaged twice as the images 6X', 6X on the center axis (axis of rotational symmetry) 1.

And, in the section including the center axis 1 (the meridional section: FIG. 4), the light beams 2, 3U, 3L (3U is a light beam coming from the sky in the distance, and 3L is a light beam coming from the face of the earth in the distance) are imaged once at the position $4Y_1$ between the first reflective surface 11 and the second reflective surface 12 and again imaged at the position $4Y_2$ between the second reflective surface 12 and the second transmissive surface 14. In the plane that is orthogonal to the plane including the center axis 1 and includes the center ray $2_0$ of the light beam 2 (the sagittal section: FIG. 2), on the other hand, they are imaged once at the position $4X_1$ between the first reflective surface 11 and the second reflective surface 12 and again imaged at the position $4X_2$ between the second reflective surface 12 and the second transmissive surface 14.

The specifications of Example 2 are:

| Horizontal angle of view: | 360° |
|---|---|
| Vertical angle of view: | 45° (the center angle of view of 22.5° (elevation angle)) |
| Entrance pupil diameter: | 1.59 mm |
| Image size: | φ2.40-φ5.42 mm |

In the optical system of Example 2, the first reflective surface 11 is located nearer to the image plane 30 side than the first transmissive surface 13; the second reflective surface 12 is located facing away the image plane 30 with respect to the first reflective surface 11; and the second transmissive surface 14 is located nearer to the image plane 30 side than the first transmissive surface 13.

With the image plane 30 lying parallel with the face of the earth, the optical system of Example 2 is preferably used at an angle of view lying up at the sky.

Figure 6:
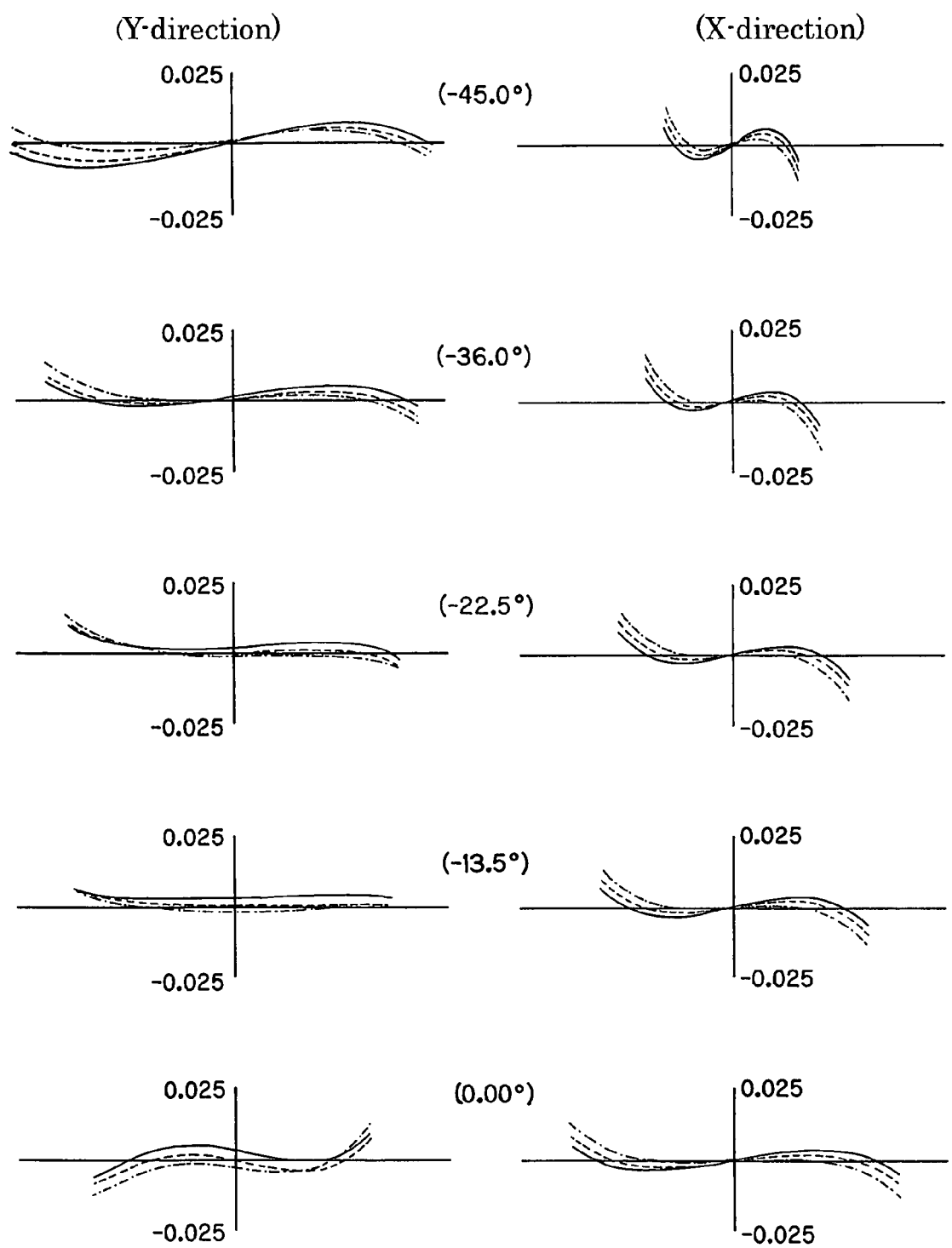
FIG. 6 is a transverse aberration diagram for the whole optical system according to Example 2.

FIG. 6 is a transverse aberration diagram for the whole optical system of this example.

Figure 7:
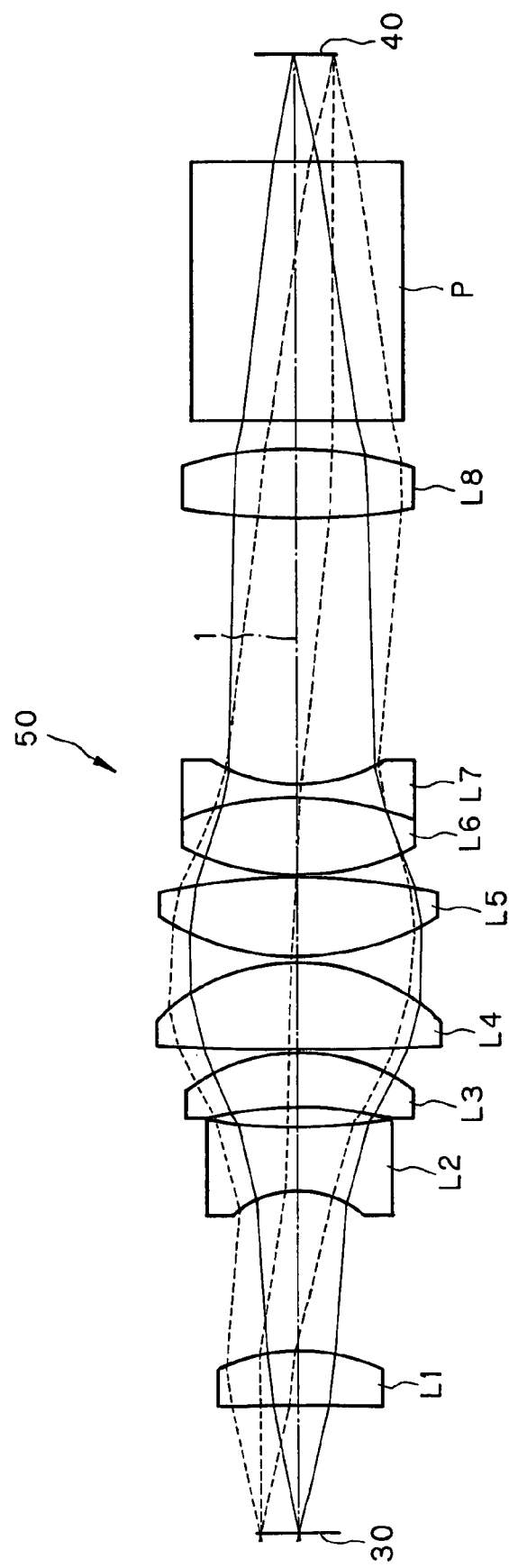
FIG. 7 is a sectional view of the relay optical system according to Example 3 of the invention, as taken on the center axis.
Figure 8:
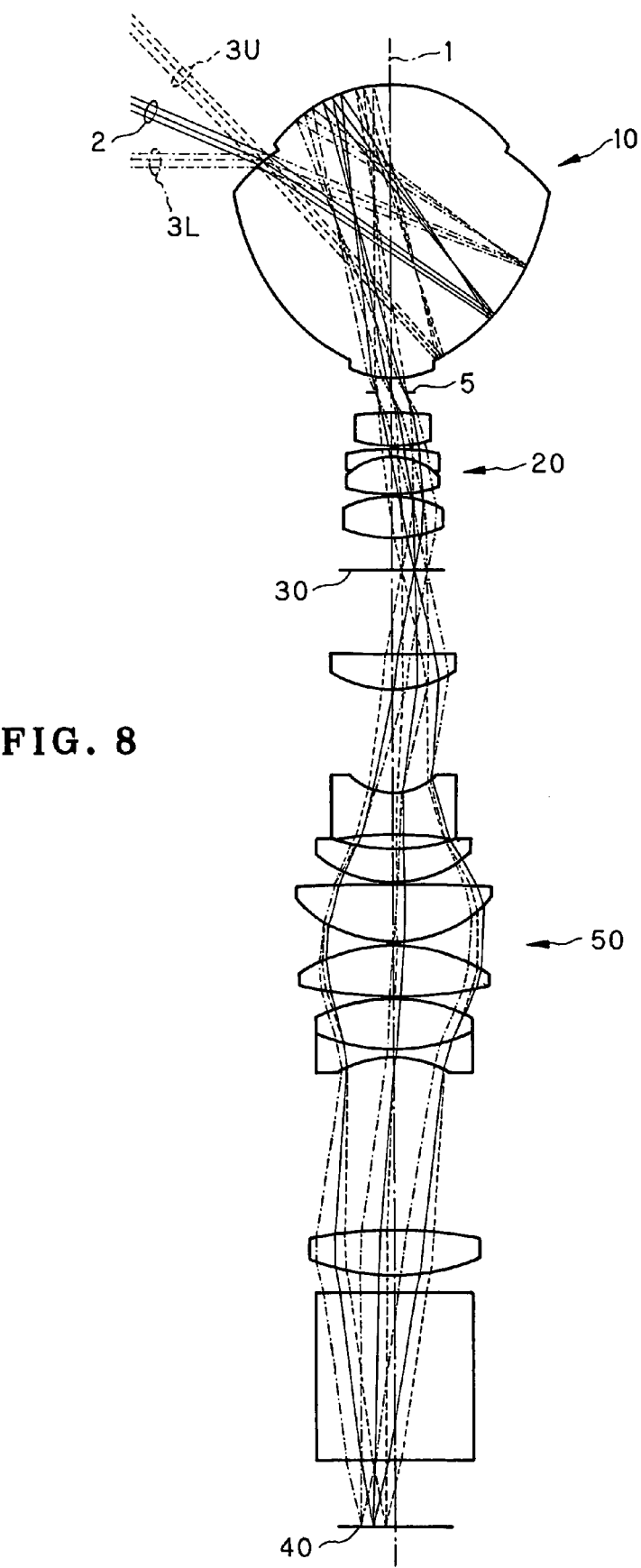
FIG. 8 is a sectional view of the relay optical system of Example 3 connected to the image plane side of the optical system of Example 2, as taken on the center axis.

FIG. 7 is a sectional view of the relay optical system of Example 3 as taken along the center axis 1, and FIG. 8 is a sectional view of the relay optical system of Example 3 connected to the image plane 30 side of the optical system of Example 2, as taken along the center axis 1.

This example is directed to an example of the relay optical system 50 adapted to relay an annular image imaged on the image plane 30 of the invention, for instance, that of Example 1 or 2, to the second image plane 40 (FIG. 8 is a sectional view of the relay optical system 50 of Example 3 connected to the image plane 30 side of the optical system of Example 2). This relay optical system 50 is consists of, in order from the image plane 30 side, a positive meniscus lens L1 concave on the object side, a double-concave negative lens L2, a positive meniscus lens L3 concave on the object side, a double-convex positive lens L4, a double-convex positive lens L5, a cemented lens of a double-convex positive lens L6 and a double-concave negative lens L7, and a double-convex positive lens L8, or seven lens groups or eight lenses in all. A color separation prism P (a color synthesis prism in the case of a projection optical system) is disposed between the double-convex positive lens L8 and the second image plane 40 (back focus)

The specifications of the relay optical system according to Example 3 are:

| Magnification: | 1.0 |
|---|---|
| Focal length: | 145.34 mm |
| Entrance side NA: | 0.22 |
| Object height: | φ6.00 mm |
| Image size: | φ6.00 mm |

Figure 9:
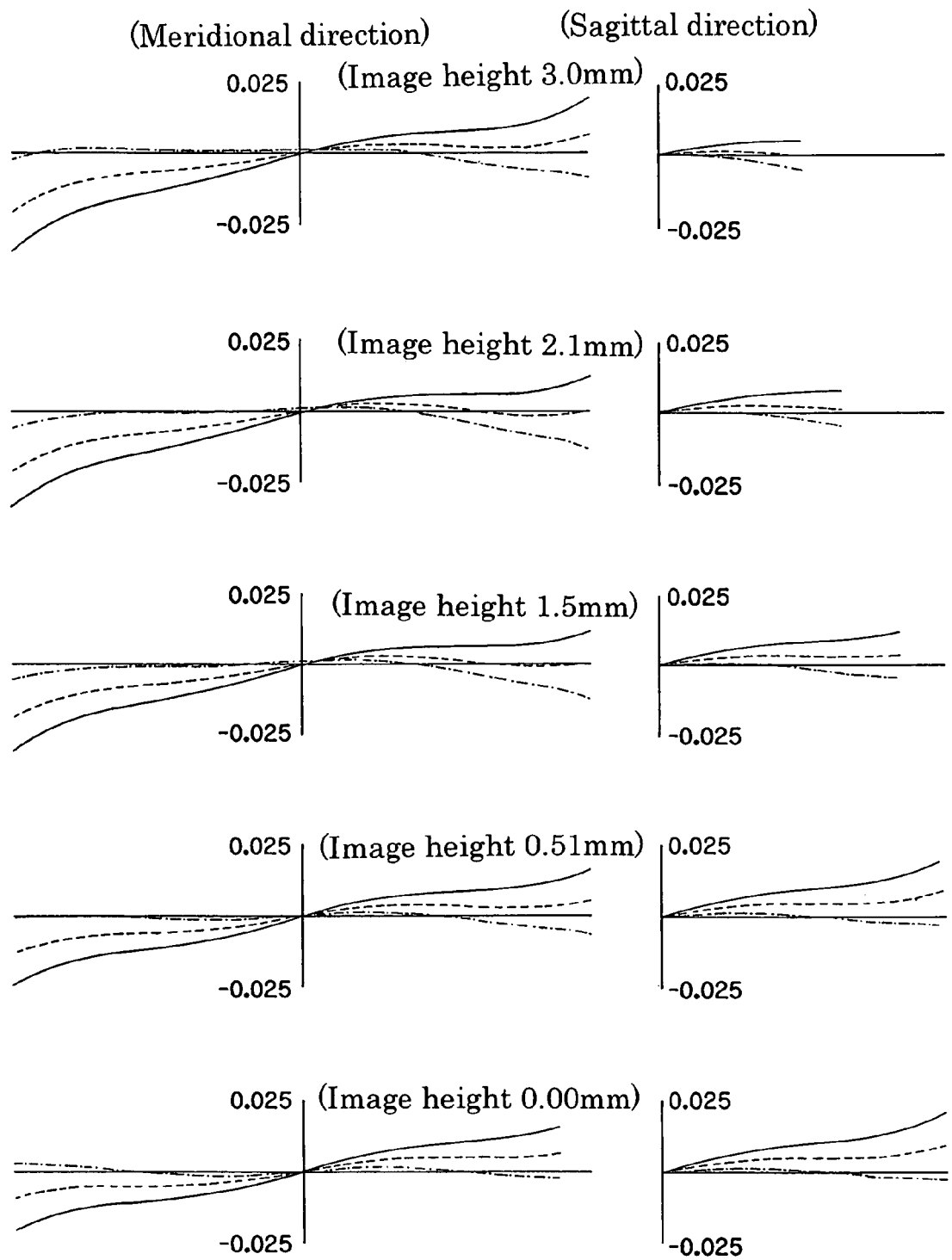
FIG. 9 is a transverse aberration diagram for the relay optical system of Example 3.
Figure 10:
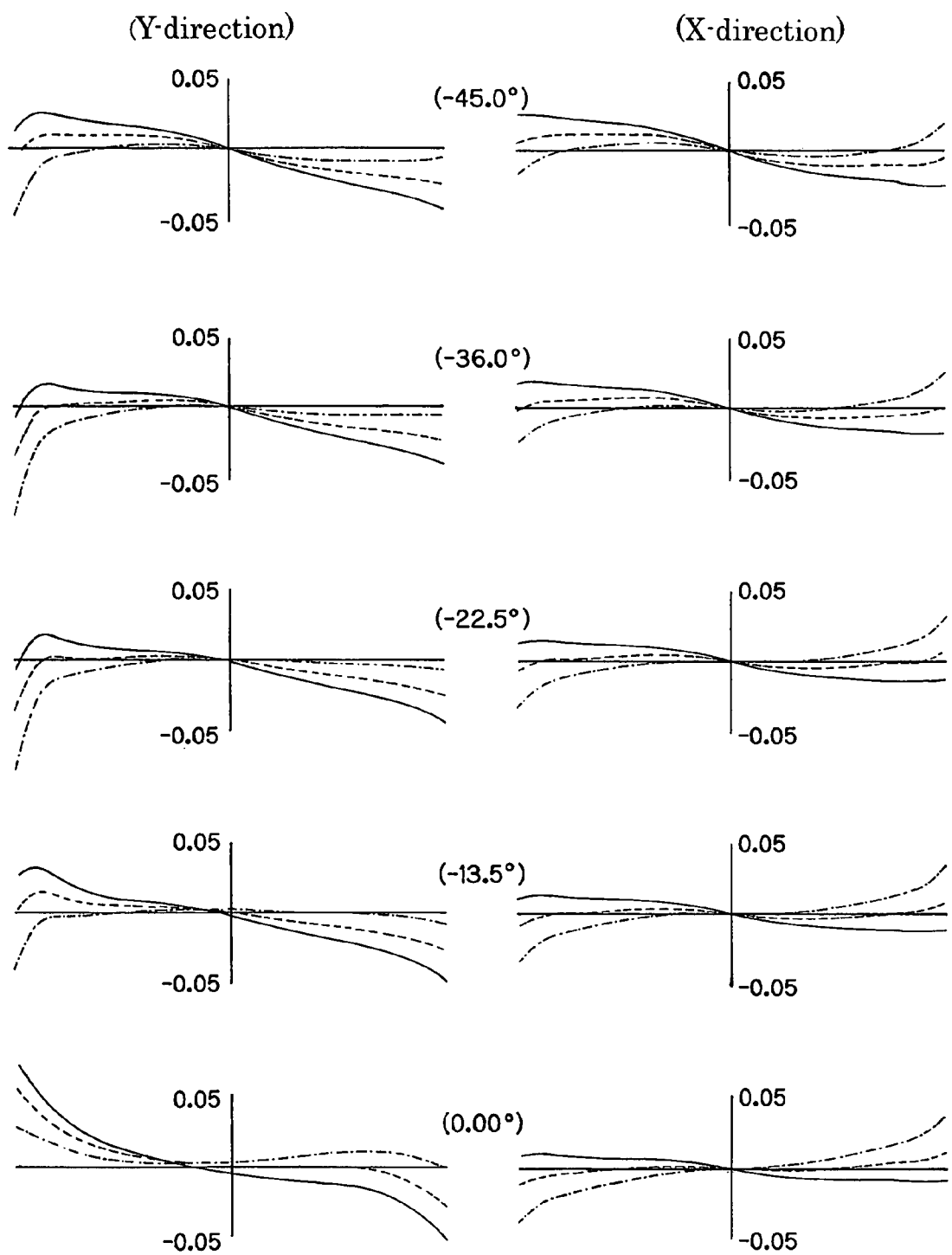
FIG. 10 is a transverse aberration diagram for the whole optical system of FIG. 8.

FIG. 9 is a transverse aberration diagram for the relay optical system 50 of Example 3, and FIG. 10 is a transverse aberration diagram for the whole arrangement wherein the relay optical system 50 of Example 3 is connected to the image plane 30 side of the optical system of Example 2.

Set out below are the constituting parameters of Examples 1, 2 and 3, wherein "ASS", "EFRS" and "RE" are the abbreviations of an aspheric surface, an extended rotation free-form surface and a reflective surface, respectively.

EXAMPLE 1

| Surface No. | Radius of curvature | Surface separation | Displacement and tilt | Refractive index | Abbe's No. |
|---|---|---|---|---|---|
| Object plane | ∞ | ∞ | | | |
| 1 | ∞(Entrance Pupil) | | (1) | | |
| 2 | ERFS[1] (RE) | | (2) | | |
| 3 | ERFS[2] (RE) | | (3) | | |
| 4 | ∞ (Stop) | | (4) | | |
| 5 | 7.64 | 1.00 | | 1.7552 | 27.6 |
| 6 | 3.00 | 3.00 | | 1.6663 | 52.8 |
| 7 | −17.90 | 0.10 | | | |
| 8 | 5.09 | 4.00 | | 1.6593 | 53.7 |
| 9 | −4.00 | 1.00 | | 1.7552 | 27.6 |
| 10 | −10.66 | 2.06 | | | |
| Image plane | ∞ | | | | |

| ERFS[1] | |
|---|---|
| RY | −21.49 |
| θ | −40.69 |
| R | 11.06 |
| $C_3$ | $1.2541 \times 10^{-3}$ |
| $C_4$ | $-1.0828 \times 10^{-4}$ |

| ERFS[2] | |
|---|---|
| RY | 21.49 |
| θ | −63.80 |
| R | −7.89 |
| $C_3$ | $4.0122 \times 10^{-3}$ |
| $C_4$ | $2.6203 \times 10^{-4}$ |

| Displacement and tilt(1) | | | | | |
|---|---|---|---|---|---|
| X | 0.00 | Y | 0.00 | Z | −15.44 |
| α | 0.00 | β | 0.00 | γ | 0.00 |

| Displacement and tilt(2) | | | | | |
|---|---|---|---|---|---|
| X | 0.00 | Y | −15.41 | Z | 0.00 |
| α | 0.00 | β | 0.00 | γ | 0.00 |

| Displacement and tilt(3) | | | | | |
|---|---|---|---|---|---|
| X | 0.00 | Y | 8.31 | Z | 0.00 |
| α | 0.00 | β | 0.00 | γ | 0.00 |

-continued

| | | Displacement and tilt(4) | | | |
|---|---|---|---|---|---|
| X | 0.00 | Y | −23.80 | Z | 0.00 |
| α | −90.00 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | ∞ | | | |
| 1 | ∞(Entrance Pupil) | | (1) | | |
| 2 | ERFS[1] | | (2) | 1.5247 | 56.2 |
| 3 | ERFS[2] (RE) | | (3) | 1.5247 | 56.2 |
| 4 | ERFS[3] (RE) | | (4) | 1.5247 | 56.2 |
| 5 | ASS[1] | | (5) | | |
| 6 | ∞ (Stop) | 1.87 | (6) | | |
| 7 | 37.74 | 4.25 | | 1.7725 | 49.6 |
| 8 | −16.07 | 0.21 | | | |
| 9 | 31.11 | 1.00 | | 1.8467 | 23.8 |
| 10 | 7.66 | 4.62 | | 1.6230 | 58.1 |
| 11 | −21.58 | 0.20 | | | |
| 12 | 13.35 | 4.98 | | 1.4970 | 81.5 |
| 13 | −17.20 | 4.01 | | | |
| Image plane | ∞ | | | | |

| ERFS[1] | |
|---|---|
| RY | −14.88 |
| θ | −52.59 |
| R | −15.46 |
| $C_3$ | $5.3125 \times 10^{-2}$ |
| $C_4$ | $-9.1728 \times 10^{-4}$ |

| ERFS[2] | |
|---|---|
| RY | −27.05 |
| θ | −27.52 |
| R | 16.42 |
| $C_3$ | $-6.3001 \times 10^{-4}$ |
| $C_4$ | $3.2085 \times 10^{-6}$ |

| ERFS[3] | |
|---|---|
| RY | 18.15 |
| θ | −53.66 |
| R | −10.43 |
| $C_3$ | $-8.2358 \times 10^{-4}$ |
| $C_4$ | $1.9194 \times 10^{-4}$ |

| ASS[1] | |
|---|---|
| R | −10.73 |
| k | 0.0000 |
| a | $4.1563 \times 10^{-4}$ |

| | | Displacement and tilt(1) | | | |
|---|---|---|---|---|---|
| X | 0.00 | Y | 0.00 | Z | −15.46 |
| α | 0.00 | β | 0.00 | γ | 0.00 |
| | | Displacement and tilt (2) | | | |
| X | 0.00 | Y | 0.00 | Z | 0.00 |
| α | 0.00 | β | 0.00 | γ | 0.00 |
| | | Displacement and tilt(3) | | | |
| X | 0.00 | Y | −12.39 | Z | 0.00 |
| α | 0.00 | β | 0.00 | γ | 0.00 |
| | | Displacement and tilt(4) | | | |
| X | 0.00 | Y | 5.58 | Z | −10.43 |
| α | 0.00 | β | 0.00 | γ | 0.00 |
| | | Displacement and tilt(5) | | | |
| X | 0.00 | Y | −25.63 | Z | 0.00 |
| α | −90.00 | β | 0.00 | γ | 0.00 |
| | | Displacement and tilt(6) | | | |
| X | 0.00 | Y | −27.63 | Z | 0.00 |
| α | −90.00 | β | 0.00 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | 9.98 | | | |
| 1 | −226.44 | 4.28 | | 1.8061 | 40.9 |
| 2 | −14.90 | 12.39 | | | |
| 3 | −7.82 | 5.00 | | 1.8061 | 40.9 |
| 4 | 43.70 | 1.73 | | | |
| 5 | −26.37 | 4.18 | | 1.5691 | 71.3 |
| 6 | −14.28 | 0.20 | | | |
| 7 | 291.23 | 7.00 | | 1.5691 | 71.3 |
| 8 | −15.60 | 0.40 | | | |
| 9 | 20.70 | 6.26 | | 1.4970 | 81.5 |
| 10 | −50.27 | 0.20 | | | |
| 11 | 19.79 | 6.13 | | 1.4875 | 70.2 |
| 12 | −24.16 | 1.00 | | 1.8061 | 40.9 |
| 13 | 12.84 | 20.83 | | | |
| 14 | 54.77 | 5.40 | | 1.6910 | 54.8 |
| 15 | −30.58 | 2.00 | | | |
| 16 | ∞ | 20.00 | | 1.5163 | 64.1 |
| 17 | ∞ | 8.08 | | | |
| Image plane | ∞ | | | | |

With the optical system of each example, a Y-toric layer may be further added to the object side of the front unit 10. If this Y toric lens has lens surfaces rotationally symmetric about the Y-axis (center axis 1) with power in the X-direction and negative power in the Y-direction (in the section of FIG. 1 or the like), it is then possible to make large the angle of view in the sectional direction including the axis of rotational symmetry 1. More preferably, that toric lens should be configured into a negative meniscus lens shape convex on the object side in the Y-Z section, because image distortion can be minimized with good correction of aberrations.

Further, if one Y toric lens of negative meniscus shape in section plus two or three lenses of meniscus shape are provided on the object side of the front unit 10, it is then possible to hold back image distortion a lot more. If such lenses plus a reflective surface or prism rotationally symmetric about the center axis 1 are provided, it is then easy to take or view images in any desired direction by reflection and refraction of light rays.

In the examples as mentioned above, each of the reflective, and refractive surfaces in the front unit 10 is constructed of an extended rotation free-form surface that is defined by rotation about the axis of rotational symmetry 1 of a line segment of any desired shape and has no vertex on the axis of rotational symmetry 1, but replacement of any desired curved surface for it would be easily achievable.

With the optical system of the invention, field tilts caused by decentration and pupil aberrations at the time of back projection of the stop are corrected by the use of the equation defining the line segment of any shape forming the rotationally symmetric surface with an odd-numbered order term added to it.

In the foregoing examples, each reflective surface, and each refracting surface in the front unit 60 is composed of a rotationally symmetric aspheric surface having a vertex on the axis 1 of rotational symmetry or an extended rotation free-form surface that is formed by rotation of a line segment of any shape about the axis 1 of rotational and has no vertex on the axis 1 of rotational symmetry; however, it is easy to replace them by any desired curved surfaces.

The optical system of the invention also makes correction for an image plane tilt occurring by decentration and pupil aberrations of the stop upon back projection by making use of the formula that defines a line segment of any shape with an odd-number order term incorporated in it. The odd-number order term for the first reflective surface is particularly important, and allowing this to have a positive value is required for correction of decentration aberrations occurring by de-centration. For correction of aberrations it is also preferable to make the Y-Z direction curvature tight (make the radius of curvature small) in the Y-axis positive direction (on the opposite side to the image plane).

By immediate use of the transparent medium that forms the front unit 10 according to the invention and is rotationally symmetric about the center axis 1, full-360° angle-of-view images may be taken or projected. However, it is also contemplated that the transparent medium is cut along a section including the center axis 1 into ½, ⅓, ⅔, etc. for the purpose of taking or projecting images having angles of view of 180°, 120°, 240°, etc. about the center axis 1.

Figure 12B:
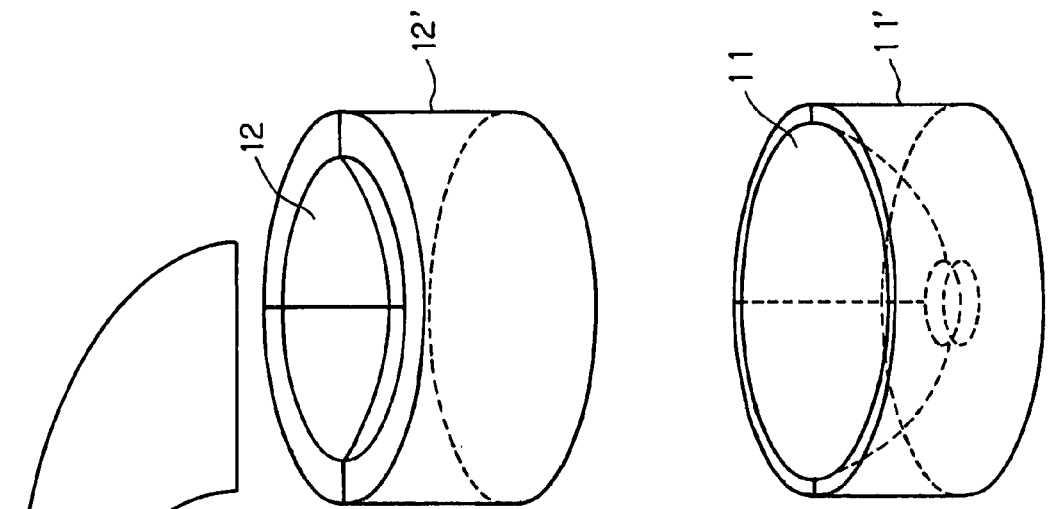
FIG. 12 is illustrative of how to set up the front unit in the optical system of the invention, which consist only of two reflective surfaces.
Figure 12A:
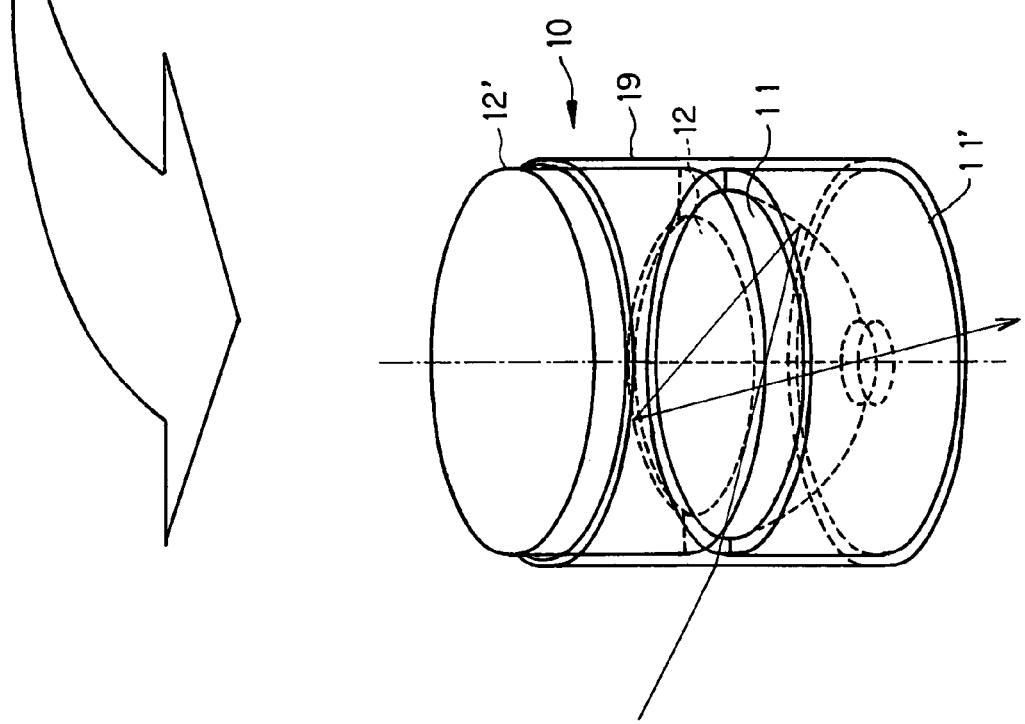

It is here noted that the front unit 10 in the optical system of the invention is described and shown as being made up of two such reflective surfaces 11, 12 alone as in Example 1. In that case, however, such front unit 10 as shown in FIG. 12(*a*) may be easily obtained by forming the first reflective surface 11 and the second reflective surface 12 coaxially at the upper ends of cylinders 11' and 12' having the same diameter, flipping over one cylinder 11' to insert the cylinders 11' and 12' into a transparent cylinder 19—having an inner diameter equal to the outer diameter of cylinder 11', 12'—from both its ends, and fixing the cylinders 11' and 12' to the cylinder 19 with a given spacing kept between them, as shown in FIG. 12(*b*).

While the optical system of the invention has been described with reference to an imaging or viewing optical system for obtaining full-360° angle-of-view (inclusive of the zenith) images with the center axis (axis of rotational symmetry) 1 lying in the vertical direction, it is understood that the invention is equally applicable to a projection optical system in which the optical path is the other way around to project full-360° angle-of-view (inclusive of the zenith) images. An endoscope could be used as a full-panoramic viewing optical system for in-tract viewing apparatus.

Figure 13A:
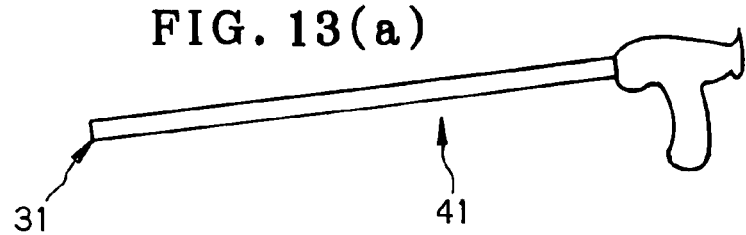
FIG. 13 is illustrative of an example where the inventive panoramic taking optical system is used as a taking optical system at the distal end of an endoscope.
Figure 13B:
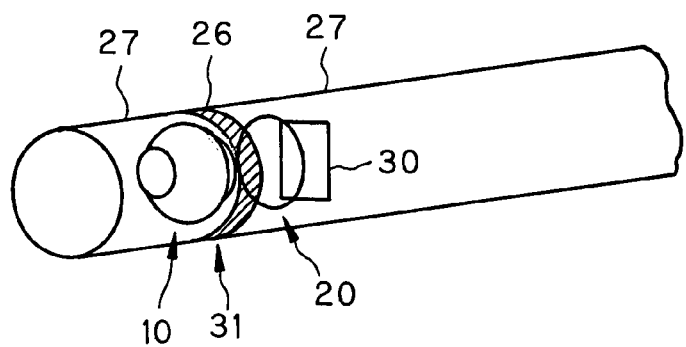
Figure 13C:
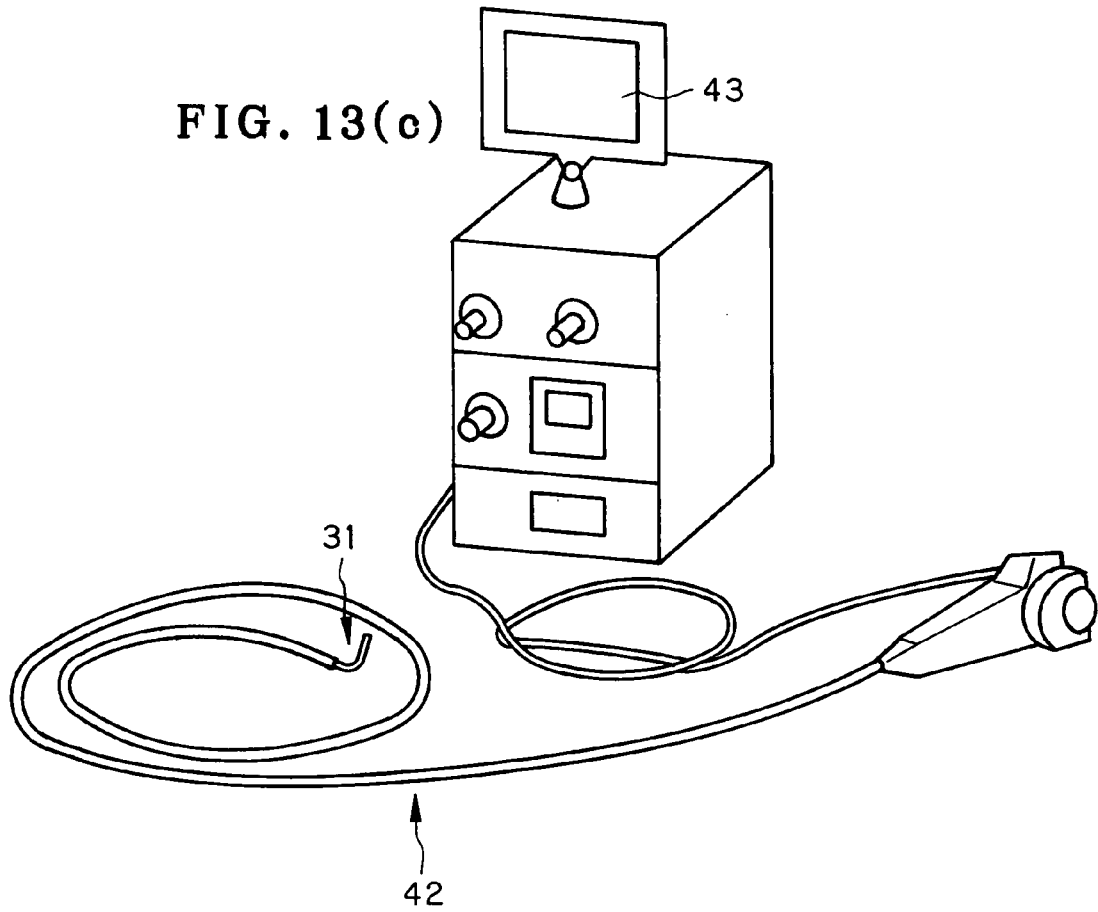

How to use a panoramic taking optical system 31 or panoramic projection optical system 32 is now explained as a typical example of application of the optical system of the invention. FIG. 13 is generally illustrative of an example of the panoramic taking optical system 31 of the invention used as a taking optical system attached to the distal end of an endoscope. More specifically, FIG. 13(*a*) is illustrative of the panoramic taking optical system 31 of the invention that is attached to the distal end of a hard endoscope 41 to take and view full-360° angle-of-view images, and FIG. 13(*b*) is illustrative in schematic of the construction of its distal portion. Around the entrance pupil 6Y of the front unit 10 in the panoramic optical system of the invention, there is a flare stop 27 disposed, which comprises a casing or the like that has an aperture 27 extending in the circumferential direction in a slit form, thereby preventing incidence of flare light. FIG. 13(*c*) is illustrative of the panoramic taking optical system 31 of the invention that is attached to the distal end of a soft electronic endoscope 42 to display a taken image on a display 43 after image processing for correction of distortion.

Figure 14A:
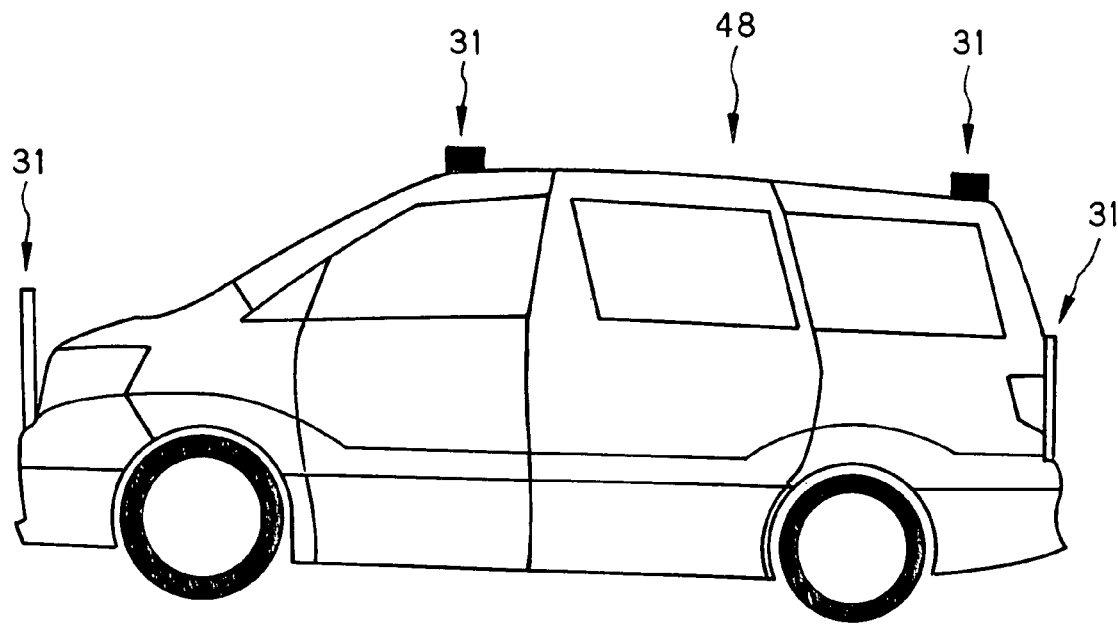
FIG. 14 is illustrative of an example where the inventive panoramic taking optical system is used as a taking optical system at each corner or the top of the pole at the head of a car.
Figure 14B:
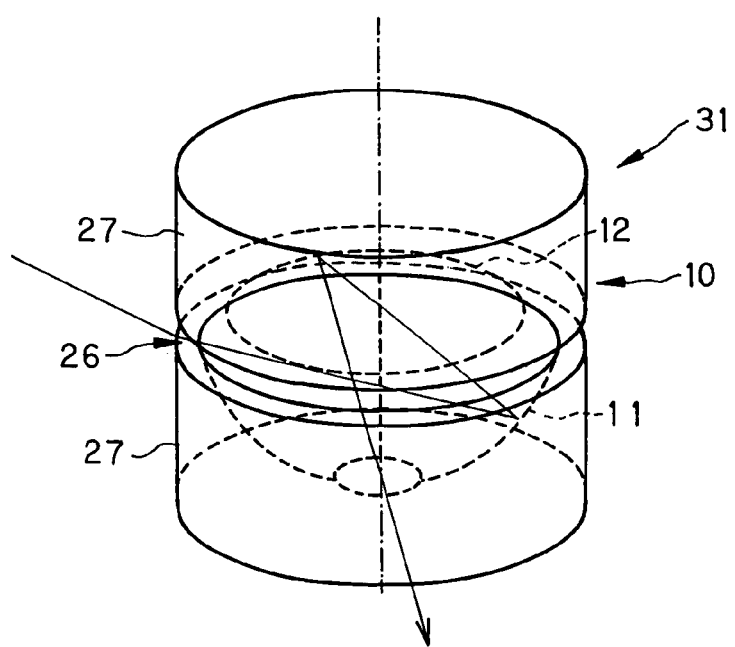

FIG. 14(*a*) is illustrative of a plurality of panoramic taking optical systems 31 of the invention that are attached to the corners and the tope of a pole at a hear portion of a car 48 as taking optical systems to display images taken via the panoramic taking optical systems 31 simultaneously on an interior display after image processing for correction of distortion.

Figure 15:
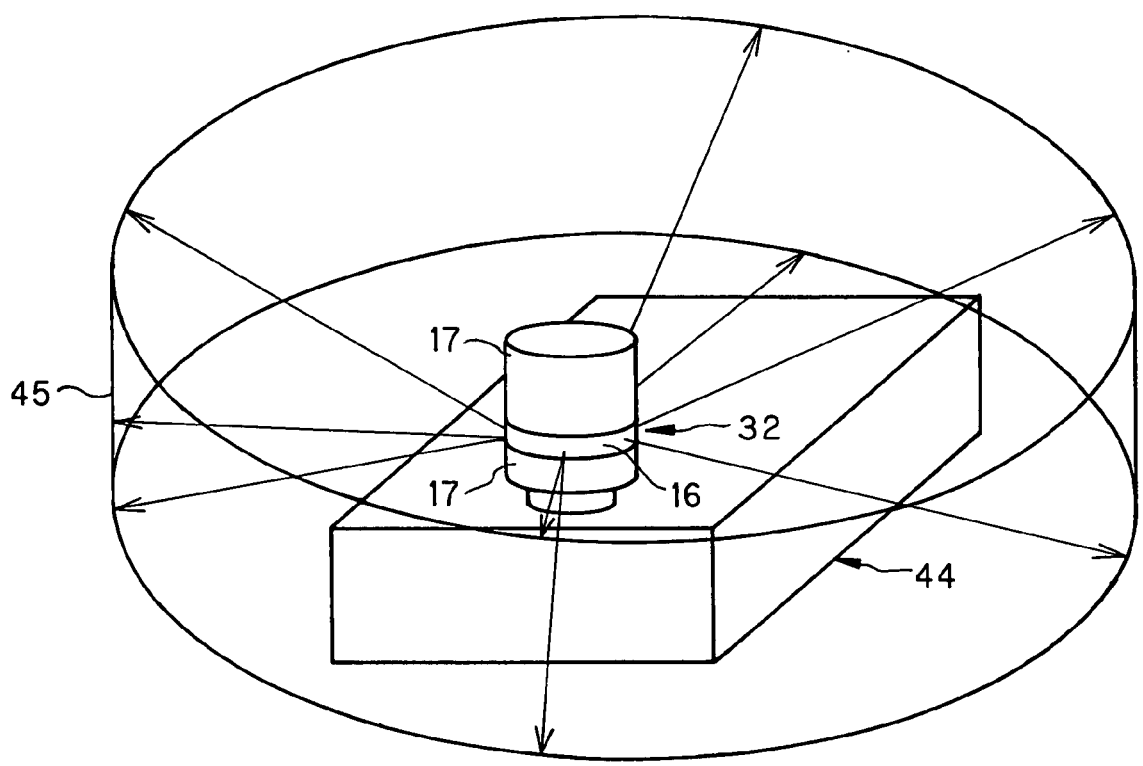
FIG. 15 is illustrative of an example where the inventive panoramic projection optical system is used as the projection optical system in projector apparatus.

FIG. 15 is illustrative of an example of a projector 44 in which the panoramic projection optical system 32 of the invention is used as its projection optical system. A panoramic image is displayed on a display device located on the image plane of the system 32, so that full-360° angle-of-view images are projected and displayed on a full-360° angle-of-view screen 45 through the panoramic optical system 32.

Figure 16:
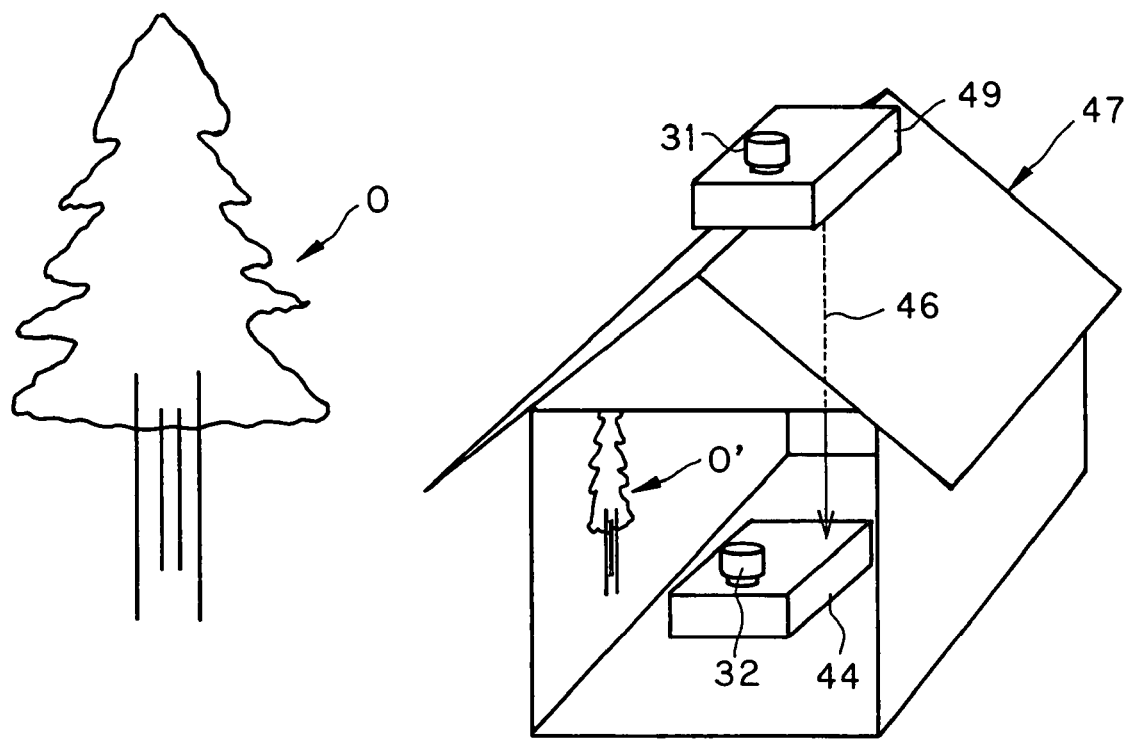
FIG. 16 is illustrative of an example where a subject out of doors is taken through the inventive panoramic taking optical system, and projected and displayed through the inventive panoramic projection optical system installed indoors.

FIG. 16 is illustrative of a taking device 49 using the panoramic taking optical system 31 of the invention, which is attached to the outside of a house 47, and a projector 44 using the panoramic projection optical system 32 of the invention, which is located inside. An image picked up by the taking device 49 is sent to the projector 44 via an electric wire 46. Such being the arrangement, a full-360° angle-of-view subject O outside the house is taken by the taking device 49 via the panoramic taking optical system 31, and image signals are sent to the projector 44 via the electric wire 46. An image of the subject is displayed on a display device located on the image plane, so that the image O' of the subject O is projected and displayed on the inside wall surface or the like of the house via the panoramic projection optical system 32.

What we claim is:

1. An optical system adapted to form a full-360° angle-of-view image on an image plane or project an image located in the image plane onto a full-360° angle of view, characterized by comprising:

a front unit including at least two reflective surfaces rotationally symmetric about a center axis and a rear unit that is rotationally symmetric about the center axis and has a positive power, wherein:

said front unit comprises, in order of travel of a light ray when said optical system is an imaging system or in an opposite order when said optical system is a projection system, a first reflective surface that is located facing away from an entrance pupil in a section including the center axis, on which entrance pupil a light beam from afar is incident, with the center axis located between them, and a second reflective surface that is located facing away from said first reflective surface with the center axis located between them, wherein a center of said first reflective surface is positioned on a rear unit side with respect to a center of said second reflective surface in a center axis direction, and the entrance pupil in the section including the center axis is located between an outer periphery of said first reflective surface and an outer periphery of said second reflective surface, and the light beam incident from afar travels through said front unit and said rear unit in order and is imaged at a position of said image plane off the center axis; in the section including the center axis, the entrance pupil is positioned off the center axis and positioned on the center axis in a plane that is orthogonal to a plane including the center axis and includes a center light ray of said light beam; and said rear unit is constructed of an optical system that comprises at least two groups and has a positive power.

2. The optical system according to claim 1, characterized in that said rear unit comprises a rotationally symmetric, coaxial dioptric system.

3. The optical system according to claim 1, characterized in that said first reflective surface has positive power in both a meridional section and a sagittal section.

4. The optical system according to claim 1, characterized in that said second reflective surface has positive power in both a meridional section and a sagittal section.

5. The optical system according to claim 1, characterized in that the first reflective surface, and the second reflective surface each has positive power in both a meridional section and a sagittal section.

6. The optical system according to claim 1, characterized in that there is an aperture located somewhere on an image plane side with respect to said front unit, wherein said aperture is coaxial with the center axis.

7. The optical system according to claim 1, characterized in that at least one reflective surface has a rotationally symmetric shape formed by rotation about the center axis of a line segment of any desired shape having no plane of symmetry.

8. The optical system according to claim 3, characterized in that at least one reflective surface has a rotationally symmetric shape formed by rotation about the center axis of a line segment of any desired shape having no plane of symmetry.

9. The optical system according to claim 1, characterized in that said at leas one reflective surface has a rotationally symmetric shape formed by rotation about the center axis of a line segment of any desired shape including an odd-numbered order term.

10. The optical system according to claim 3, characterized in that said at leas one reflective surface has a rotationally symmetric shape formed by rotation about the center axis of a line segment of any desired shape including an odd-numbered order term.

11. The optical system according to any one of claims 7 to 10, characterized in that in a section including the center axis, a flare stop adapted to limit the aperture only in the section including the center axis is located near the entrance pupil.

12. The optical system according to claim 1, which further comprises, in order of travel of a light ray when said optical system is an imaging system or in an opposite order when said optical system is a projection system, a relay optical system adapted to relay an image formed on said image plane to a second image plane.

13. The optical system according to claim 12, which satisfies the following condition (1):

$$5 < F_b/h_0 \qquad (1)$$

where $F_b$ is a back focus of said relay optical system, and $h_o$ is a maximum height allowed for an image formed by said relay optical system.

14. The optical system according to claim 1, which satisfies the following condition (2):

$$10° < |\tan^{-1}(h/f_r)| \qquad (2)$$

where $f_r$ is a focal length of said rear unit, and h is a maximum height allowed for an annular image formed by said front unit.

* * * * *